(12) United States Patent
Michiels et al.

(10) Patent No.: US 12,233,667 B2
(45) Date of Patent: Feb. 25, 2025

(54) TACKY FINISH AND TEXTILE MATERIALS AND ARTICLES TREATED THEREWITH

(71) Applicant: Milliken & Company, Spartanburg, SC (US)

(72) Inventors: Dany Michiels, Haaltert (BE); Shulong Li, Spartanburg, SC (US); Sofie A. Christiaens, Kortrijk (BE)

(73) Assignee: Milliken & Company, Spartanburg, SC (US)

( * ) Notice: Subject to any disclaimer, the term of this patent is extended or adjusted under 35 U.S.C. 154(b) by 827 days.

(21) Appl. No.: 16/851,505

(22) Filed: Apr. 17, 2020

(65) Prior Publication Data

US 2020/0247185 A1 Aug. 6, 2020

Related U.S. Application Data

(60) Continuation of application No. 14/580,325, filed on Dec. 23, 2014, now abandoned, which is a
(Continued)

(51) Int. Cl.
*B60C 1/00* (2006.01)
*B60C 9/18* (2006.01)
(Continued)

(52) U.S. Cl.
CPC .................. *B60C 1/00* (2013.01); *B60C 9/18* (2013.01); *B60C 9/1807* (2013.01); *B60C 9/22* (2013.01);
(Continued)

(58) Field of Classification Search
CPC ........... B60C 1/00; B60C 9/18; B60C 9/1807; B60C 9/22; B60C 2001/0066;
(Continued)

(56) References Cited

U.S. PATENT DOCUMENTS 2,561,215 A 1/1951 Mighton
2,933,469 A 4/1960 Depew .......................... 260/29.7
(Continued)

FOREIGN PATENT DOCUMENTS

CN 1302257 7/2001
CN 101469759 7/2009
(Continued)

OTHER PUBLICATIONS

U.S. Appl. No. 13/107,015, filed May 13, 2011, Abandoned.
(Continued)

*Primary Examiner* — Robert S Walters, Jr.
(74) *Attorney, Agent, or Firm* — Brenda D. Amidon

(57) ABSTRACT

This invention relates to tacky finishes and to the textile materials and articles treated with the tacky finishes. The tacky finishes provide improved processing features for end-use articles that contain such finishes. The tacky finish may be combined with other adhesion promotion finishes in the treatment of textile materials. The textile materials and articles may be used as rubber reinforcing materials, such as automotive tire cap ply, single end tire cord, carcass reinforcement and side wall reinforcement. End-use articles that contain the treated textile materials include rubber-containing materials such as automobile tires, belts, and hoses. This invention also relates to the methods for manufacturing the treated textile materials and articles.

18 Claims, 5 Drawing Sheets

Related U.S. Application Data continuation of application No. 14/148,876, filed on Jan. 7, 2014, now abandoned, which is a division of application No. 13/107,027, filed on May 13, 2011, now Pat. No. 8,651,157.

(60) Provisional application No. 61/354,853, filed on Jun. 15, 2010.

(51) Int. Cl.
| | | |
|---|---|---|
| *B60C 9/22* | (2006.01) | |
| *C08G 8/22* | (2006.01) | |
| *C08L 61/12* | (2006.01) | |
| *C09D 5/00* | (2006.01) | |
| *C09D 7/48* | (2018.01) | |
| *C09D 7/65* | (2018.01) | |
| *C09D 107/02* | (2006.01) | |
| *D06M 15/21* | (2006.01) | |
| *D06M 15/41* | (2006.01) | |
| *D06M 15/693* | (2006.01) | |

(52) U.S. Cl.
CPC ............... *C08G 8/22* (2013.01); *C08L 61/12* (2013.01); *C09D 5/00* (2013.01); *C09D 7/48* (2018.01); *C09D 7/65* (2018.01); *C09D 107/02* (2013.01); *D06M 15/21* (2013.01); *D06M 15/41* (2013.01); *D06M 15/693* (2013.01); *B60C 2001/0066* (2013.01); *B60C 2001/0083* (2013.01); *Y10T 152/10765* (2015.01); *Y10T 428/29* (2015.01); *Y10T 428/2915* (2015.01); *Y10T 428/2938* (2015.01); *Y10T 442/20* (2015.04); *Y10T 442/2098* (2015.04); *Y10T 442/2738* (2015.04)

(58) Field of Classification Search
CPC .... B60C 2001/0083; C09D 7/65; C09D 7/48; C09D 5/00; C09D 107/02; C08G 8/22; C08L 61/12; D06M 15/21; D06M 15/41; Y10T 428/29; Y10T 152/10765; Y10T 428/2915; Y10T 428/2938; Y10T 442/20; Y10T 442/2098; Y10T 442/2738
See application file for complete search history.

(56) References Cited

U.S. PATENT DOCUMENTS

| | | | | |
|---|---|---|---|---|
| 3,460,599 | A | 8/1969 | Leach | 152/362 |
| 3,525,703 | A | 8/1970 | Ichiro | |
| 3,658,571 | A | 4/1972 | Marzocchi | 117/65.2 |
| 4,024,895 | A * | 5/1977 | Barron | D03D 15/41 |
| | | | | 57/902 |
| 4,248,770 | A | 2/1981 | Matsuo et al. | 260/104 |
| 4,284,117 | A | 8/1981 | Poque et al. | 152/361 |
| 4,409,055 | A | 10/1983 | Elmer | |
| 4,739,814 | A | 4/1988 | Berczi et al. | 152/527 |
| 5,246,735 | A | 9/1993 | Takata et al. | 427/175 |
| 5,286,783 | A | 2/1994 | Hisaki et al. | 524/510 |
| 5,365,988 | A | 11/1994 | Soderberg et al. | 152/527 |
| 5,565,507 | A | 10/1996 | Marco et al. | 523/413 |
| 6,046,262 | A | 4/2000 | Li et al. | 524/261 |
| 6,096,156 | A | 8/2000 | Morin et al. | 156/272.6 |
| 6,333,281 | B1 | 12/2001 | Li et al. | 442/157 |
| 6,346,563 | B1 | 2/2002 | Li et al. | 524/261 |
| 6,358,605 | B1 | 3/2002 | Casper | 428/343 |
| 6,444,322 | B1 | 9/2002 | Li et al. | 428/447 |
| 6,497,954 | B1 | 12/2002 | Morin et al. | 428/375 |
| 6,602,379 | B2 | 8/2003 | Li et al. | 156/335 |
| 6,686,301 | B2 | 2/2004 | Li et al. | 442/157 |
| 7,252,129 | B2 | 8/2007 | Michiels et al. | 152/531 |
| 7,614,436 | B2 | 11/2009 | Ternon et al. | 152/526 |
| 2004/0014389 | A1 | 1/2004 | Chu et al. | 442/394 |
| 2004/0033356 | A1 | 2/2004 | Ando | |
| 2006/0185778 | A1 | 8/2006 | Michiels et al. | 152/533 |
| 2007/0102115 | A1 | 5/2007 | Falke | |
| 2009/0294008 | A1 | 12/2009 | Michiels et al. | 152/527 |
| 2009/0294010 | A1 | 12/2009 | Michiels et al. | 152/527 |
| 2009/0294025 | A1 | 12/2009 | Michiels et al. | 156/117 |

FOREIGN PATENT DOCUMENTS

| | | | | |
|---|---|---|---|---|
| EP | 775719 | A2 * | 5/1997 | ............... B60C 1/00 |
| EP | 0987128 | A2 * | 3/2000 | ............... B60C 9/02 |
| EP | 1285737 | | 2/2003 | |
| EP | 1 304 404 | | 4/2003 | |
| EP | 1371618 | A1 * | 12/2003 | ............ C03C 25/27 |
| EP | 1541617 | | 6/2005 | |
| GB | 1082549 | A * | 9/1967 | ............ C09J 111/00 |
| GB | 1324900 | A * | 7/1973 | ............. C08L 21/00 |
| JP | 07138885 | A | 5/1995 | |
| JP | 07276567 | A | 10/1995 | |
| JP | 10-195768 | | 7/1998 | |
| JP | 2006274492 | | 10/2006 | |
| WO | 2005/002883 | A1 | 1/2005 | |

OTHER PUBLICATIONS

U.S. Appl. No. 13/107,027, filed May 13, 2011, Granted.
U.S. Appl. No. 14/148,876, filed Jan. 7, 2014, Abandoned.
U.S. Appl. No. 14/580,325, filed Dec. 23, 2014, Pending.
Patent Cooperation Treaty PCT International Search Report. Date of Mailing, Dec. 15, 2011. International Application No. PCT/US2011/001069. International Filing Date: Jun. 14, 2011.
B. Crowther, Handbook of Rubber Bonding, Shropshire, UK, pp. 1-400, 2003.

* cited by examiner

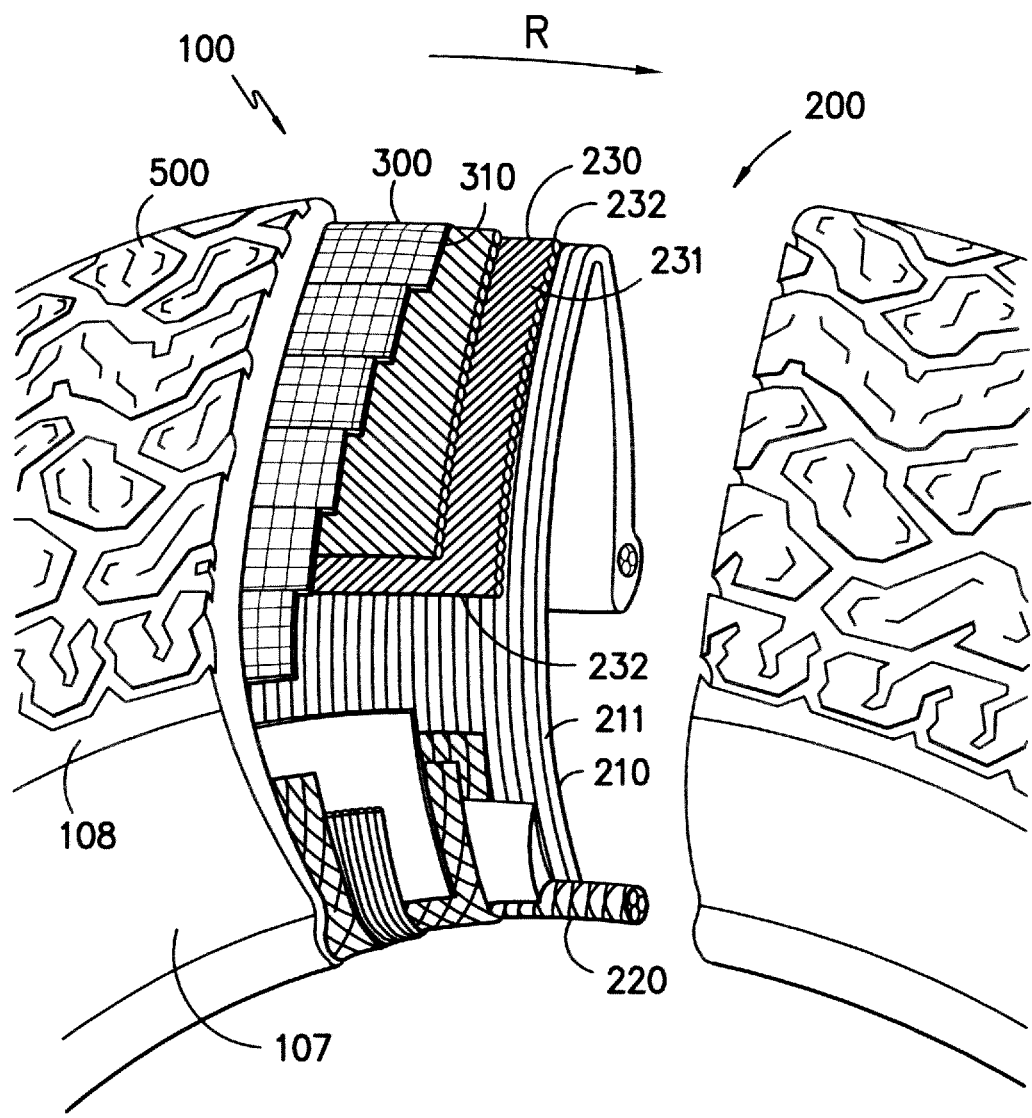
FIG. -1-

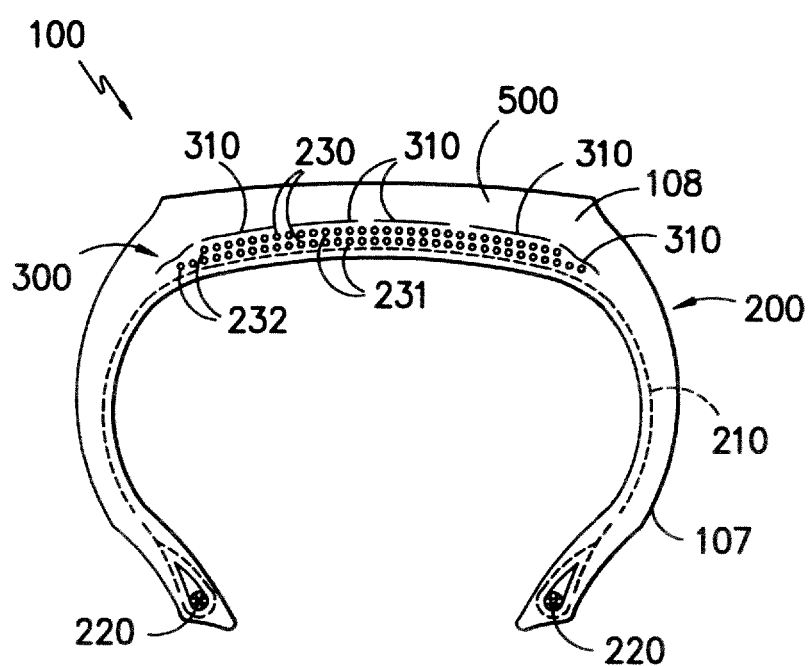
FIG. -2-

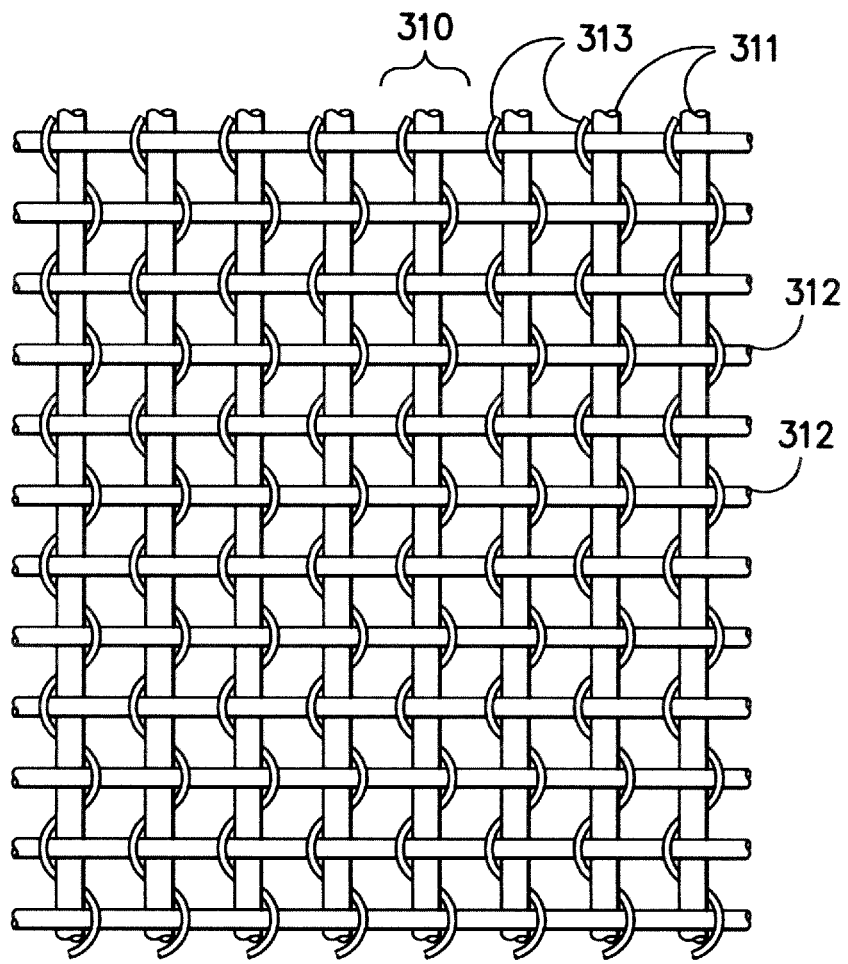
FIG. -3-

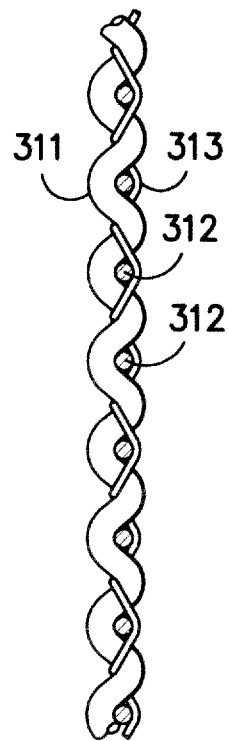
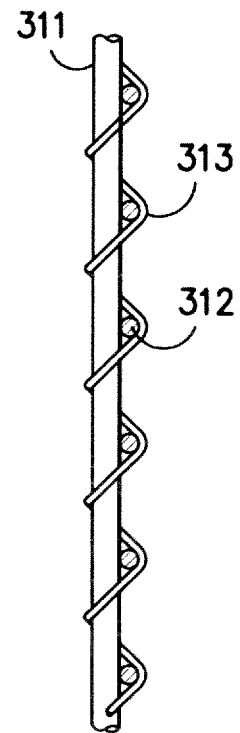
FIG. -4-    FIG. -5-
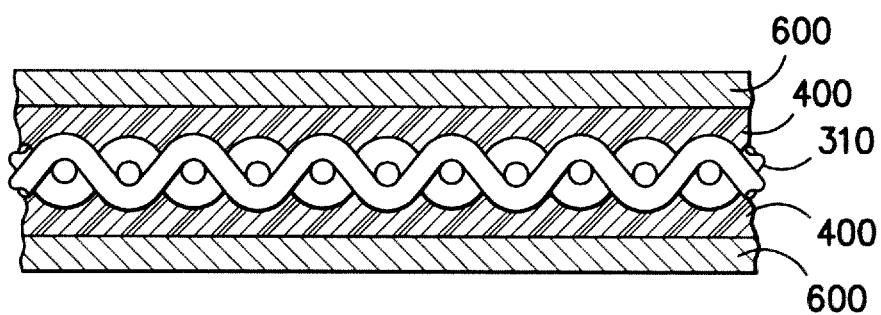
FIG. -7-

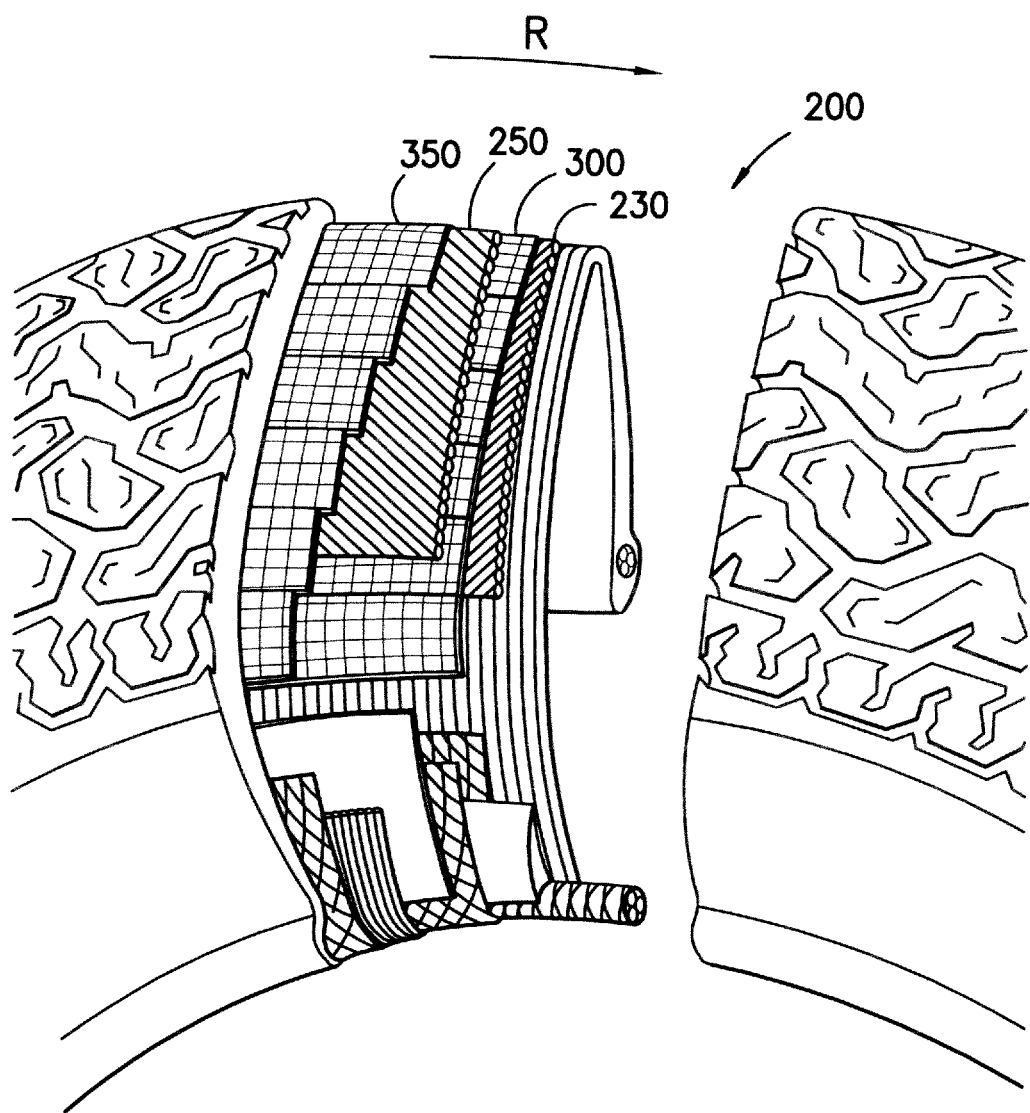
FIG. -6-

TACKY FINISH AND TEXTILE MATERIALS AND ARTICLES TREATED THEREWITH

CROSS REFERENCE TO RELATED APPLICATIONS

This application is a continuation of U.S. patent application Ser. No. 14/580,325, entitled "Tacky Finish and Textile Materials and Articles Treated Therewith" which was filed on Dec. 23, 2014, which is a continuation of U.S. patent application Ser. No. 14/148,876, entitled "Tacky Finish and Textile Materials and Articles Treated Therewith" which was filed on Jan. 7, 2014, which is a divisional of and claims priority to U.S. patent application Ser. No. 13/107,027, entitled "Tacky Finish and Textile Materials and Articles Treated Therewith" which was filed on May 13, 2011, which claims priority to U.S. Provisional Patent Application No. 61/354,853, entitled "Tacky Finish and Textile Materials and Articles Treated Therewith" which was filed on Jun. 15, 2010, all of which are entirely incorporated by reference herein.

FIELD OF THE INVENTION

This invention relates to tacky finishes and to the textile materials and articles treated with the tacky finishes. The tacky finishes provide improved processing features for end-use articles that contain such finishes. The tacky finish may be combined with other adhesion promotion finishes in the treatment of textile materials. The textile materials and articles may be used as rubber reinforcing materials, such as automotive tire cap ply, single end tire cord, carcass reinforcement and side wall reinforcement. End-use articles that contain the treated textile materials include rubber-containing materials such as automobile tires, belts, and hoses. This invention also relates to the methods for manufacturing the treated textile materials and articles.

BACKGROUND OF THE INVENTION

In the area of tire manufacturing, tires are typically made from single or multiple carcasses of substantially U-shaped sections having metal beads at the inner perimeters of the walls. Support can be provided to a tire carcass by steel cord belt plies extending around the outer periphery of the carcass and across the width of the tread. Such steel belt plies are relatively inextensible in the intended direction of rotation of the tire and include steel belt cords disposed parallel to that direction or at a low angle thereto. The belt plies act to restrict the movement of the tread and give the tire better road-holding properties. Support such as this type is particularly important in a radial tire, where the carcass is formed from a rubberized woven fabric having relatively inextensible reinforcing cords running transversely, i.e. radially, from bead to bead.

Technical difficulties have been encountered in incorporating steel belts into the tread area of the tire. One of the difficulties lies in ensuring good adhesion between the steel and the rubber. The centrifugal force of the steel belts can cause difficulty in the adhesion of the belt within the tire. Additionally, movement of the steel belts at higher speeds tends to create excessive temperatures in the tire, which can cause tread failure and de-lamination of the layers comprising the tire. The problem of de lamination is particularly noticeable in the shoulder area of the tire.

One solution of the problem previously used by tire manufactures is to use a layer of calendared fabric laid circumferentially over the belt. This calendared fabric can also be used with wide fabric strips placed over the shoulder area of the tire, retaining the edges of the steel belt in a specific location of the tire. An example of this type of tire can be found in U.S. Pat. No. 4,284,117, issued to Poque et al. on 18 Aug. 1981. In order to cover the entire circumference of the tire and be retained in place, the prior art fabric must overlap itself across the width of tire at some location on the circumference. The overlapping area helps retain the prior art fabric around the circumference of the tire. However, because this type of overlapping adds weight, the potential length of the overlap is limited. A shorter overlap limits the length of the fabric and thereby the strength that the fabric can give to the tire. Additionally, the overlapping section of the fabric causes an uneven thickness of the fabric around the circumference.

To overcome this difficulty, a rubber tape was formed that had cords disposed longitudinally within the tape, and was wound around the belt plies and across the width of the tire. An example of this type of tire can be found in WO 2005/002883, filed by Pirelli Pneumatic S.P.A., and published on 13 Jan. 2005. The continuous nature of the tape provided greater strength. However, the longitudinal yarns were positioned in a spaced apart relationship by the rubber of the tape, which does not provide resistance to the separation of the yarns by items that probe at the area between the yarns.

Additional technical issues are encountered during the tire manufacturing process due to the fact that the tire itself is comprised of many separate layers that are stacked or layered on top of one another until the final vulcanization step, which physically adheres all of the layers together into the final tire product. As these layers are added to form the tire, they have the ability to undesirably shift and move. As a result, when the tire approaches the final step of vulcanization, they layers may be out of place and could result in improperly formed tire products. Due to the seriousness of forming a good, quality tire, this issue of shifting and movement of the layers needs to be minimized as much as possible. The present invention provides a solution to obviate or mitigate these difficulties of the prior art.

The tacky finish of the present disclosure is well suited for providing adherence and stability to several layers of the tire carcass. The tacky finish adheres the textile cap ply layer of the tire to the outer tread layer and to the inner belt ply layer, thus, preventing these layers from moving and/or shifting during the tire manufacturing process. The tacky finish provides these features without interfering with the final vulcanization of the layers of the tire. Furthermore, the tacky finish is temperature and humidity stable, providing adequate product shelf-life that makes it suitable for use end-use products after some aging has occurred.

The inclusion of textile materials coated with the tacky finish of the present invention also allows for a reduction in the amount of other materials needed in formation of the tire. For example, the need for additional rubber coatings may be reduced or eliminated altogether because these rubber coating layers are no longer needed to help improve the adherence of layers of the tire together. Furthermore, the addition of a tacky finish, or textile materials containing the tacky finish, also results in the elimination of some processes normally needed to form the tire. For example, at least one textile component of the tire currently requires exposure to a calendaring process, in order to make it suitable for use in the tire. By incorporating a textile material having a tacky finish thereon, the need for the calendaring process can be eliminated, resulting in reduced complexity in the process of manufacturing tires. For these reasons, and others that will be described herein, the present tack finish represents a useful advance over the prior art.

BRIEF SUMMARY OF THE INVENTION

Provided herein is a composition for adhering textile materials and rubber-containing articles comprising: (a) at least one resorcinol-formaldehyde-latex composition; and (b) a tacky finish, wherein the tacky finish is comprised of: (i) at least one tacky resin; (ii) at least one unvulcanized rubber; and (iii) at least one adhesion promoter.

Further provided herein is a coated textile material comprising: (a) a textile substrate; and (b) a composition comprising: (i) at least one resorcinol-formaldehyde-latex compound; and (ii) a tacky finish, wherein the tacky finish is comprised of at least one tacky resin, at least one unvulcanized rubber, and at least one adhesion promoter.

Yet another alternative includes a composition for adhering textile materials and rubber-containing articles comprising: (a) at least one resorcinol-formaldehyde-latex composition and at least one tacky resin; and (b) a tacky finish, wherein the tacky finish is comprised of: (i) at least one tacky resin; (ii) at least one unvulcanized rubber; and (iii) at least one adhesion promoter.

Further provided herein is a coated textile material comprising: (a) a textile substrate; and (b) a composition, wherein the composition comprises: (i) at least one resorcinol-formaldehyde-latex composition and at least one tacky resin; and (ii) a tacky finish, wherein the tacky finish is comprised of at least one tacky resin, at least one unvulcanized rubber, and at least one adhesion promoter.

Further provided herein is a tire comprising: (a) at least one layer of textile material coated with a composition, wherein the composition comprises: (i) at least one resorcinol-formaldehyde-latex composition; and (ii) a tacky finish, wherein the tacky finish is comprised of at least one tacky resin, at least one unvulcanized rubber, and at least one adhesion promoter; and (b) at least one layer of vulcanized rubber, wherein the vulcanization of the vulcanized rubber occurred at least partially after inclusion in the tire.

Also provided herein is a method for forming a textile-rubber composite having a tacky finish comprising the steps of: (a) providing at least one layer of textile material; (b) applying a resorcinol-formaldehyde-latex composition to at least one surface of the textile material to form a coated textile material; (c) heating/curing the coated textile material to form a textile-rubber composite; (d) applying a tacky finish to at least one surface of the textile-rubber composite, wherein said tacky finish comprises: (i) at least one tacky resin; (ii) at least one unvulcanized rubber; and (iii) at least one adhesion promoter.

Also provided herein is a method for forming a textile-rubber composite having a tacky finish comprising the steps of: (a) providing a textile material; (b) applying a mixture comprising a resorcinol-formaldehyde-latex composition and a tacky resin to at least one surface of the textile material to form a coated textile material; (c) heating/curing the coated textile material to form a textile-rubber composite; (d) applying a tacky finish to at least one surface of the textile-rubber composite, wherein the tacky finish comprises: (i) at least one tacky resin; (ii) at least one unvulcanized rubber; and (iii) at least one adhesion promoter.

Yet another alternative includes a cap ply comprising: (a) a textile substrate having a tacky finish, the tacky finish comprising (i) at least one tacky resin; (ii) at least one unvulcanized rubber; and (iii) at least one adhesion promoter.

Further provided herein is a tire comprising a cap ply wound over a steel belt ply, wherein the cap ply comprises: (a) a textile substrate having a tacky finish, the tacky finish comprising: (i) at least one tacky resin; (ii) at least one unvulcanized rubber; and (iii) at least one adhesion promoter.

BRIEF DESCRIPTION OF THE DRAWINGS

FIG. 1 is a cutaway partial view of a pneumatic radial tire illustrating one embodiment of the invention.

FIG. 2 is a cross-sectional view corresponding to FIG. 1.

FIG. 3 is an enlarged cutaway partial view of a leno tape for use in the tire of FIG. 1.

FIG. 4 is an enlarged cutaway side view of a leno tape before tire construction.

FIG. 5 is an enlarged cutaway side view of a leno tape after tire construction.

FIG. 6 is a cutaway partial view of a pneumatic tire according to another embodiment of the present invention.

FIG. 7 is an enlarged view of one embodiment of the invention.

DETAILED DESCRIPTION OF THE INVENTION

All U.S. and foreign patents and U.S. patent applications disclosed in this specification are hereby incorporated by reference in their entirety.

Without limiting the scope of the invention, the preferred features and embodiments of the invention are hereinafter set forth. Unless otherwise indicated, all parts, percentages and ratios are by weight. The term "copolymer" is intended to include polymers containing two, three or more types of monomer units. The term "styrene-butadiene rubber" may be represented as "SBR," and "nitrile-butadiene rubber" may be represented as "NBR."

Referring now to the Figures and in particular to FIGS. 1 and 2, there is shown a tire 100, comprising side walls 107 joined to a tread 500 by shoulders 108. The tire 100 includes a carcass 200 covered by the tread 500. In FIGS. 1 and 2, the tire 100 is a radial tire. However, the present invention is not limited to radial tires and can also be used with other tire constructions. The carcass 200 is formed from one or more plies of tire cord 210 terminating at the inner periphery of the tire in metal beads 220, with at least one belt ply 230 located circumferentially around the tire cord 210 in the area of the tread 500. The tire cord 210 is a rubberized woven fabric having its warps formed from relatively inextensible reinforcing cords 211.

In the tire shown in FIG. 1, the carcass 200 is constructed so that the reinforcing cords 211 are running substantially radially of the intended direction of rotation R of the tire 100. The reinforcing cord may comprise the textile material described herein. In one embodiment, the reinforcing cord may comprise an RFL (resorcinol-formaldehyde-latex) finish composition and a tacky finish. The tacky finish may be applied over the RFL finish. Alternatively, the tacky finish composition and the RFL finish may be combined and applied to the cord fabric. In another embodiment, the reinforcing cord includes a tacky finish described herein. No calendered rubber layer is required to be included with the reinforcing cord before being incorporated into a tire.

With respect to general construction of pneumatic tires, and in particular to the construction of ply tires with a fiber-reinforced carcass, the fiber-reinforced carcass may include one or more plies of carcass reinforcement fabric having a warp or machine direction and a weft or cross-machine direction. Substantially inextensible reinforcing cords may extend in the cross-machine direction. The carcass reinforcement fabric is typically of one-piece construction with the machine direction of the fabric disposed in substantial alignment with the rotation of the tire and with the reinforcing cords disposed in a radial pattern transverse to the rotation of the tire.

Referring back to FIGS. 1 and 2, the belt plies 230 are formed with relatively inextensible warp materials 231, such as steel cord reinforcing warps, which run in the intended direction of rotation R of the tire or, more usually, at a slight angle thereto. The angle of the inextensible warp materials 231 can vary with the method of construction or application. The belt plies 230 extend across the width of the tread 500 of the tire terminating in edges 232 in the area of the shoulder 108 of the tire 100, i.e. the area where the tread 500 meets the side wall 107.

The cap ply layer 300 is located between the belt plies 230 and the tread 500. The cap ply layer 300 may be formed from a leno tape 310 which is wound circumferentially around the carcass 200 of the tire 100 in a flat helical pattern, resulting in a leno cap ply layer. Alternatively, the cap ply layer may be constructed of knit cap ply or any other fiber and/or fabric construction that is suitable for use in tire manufacturing.

In one embodiment, the leno tape 310 is wound more frequently at the edges of the tire than the middle of the tire. As illustrated in FIG. 3, the leno tape 310 includes a pair of warp yarns, the first warp yarn 311 and the second warp yarn 313, and weft yarns 312. The leno weave is a weave such that the warp yarns (311, 313) of the warp yarn pairs are arranged with one warp yarn twisted around the other warp yarn between picks of the weft yarn 312. The leno weave gives the leno tape 310 firmness and strength to an open-weave fabric and prevents slippage and displacement of the warp and weft yarns. The first and second warp yarns 311, 313 extend longitudinally along the leno tape 310, which also warp around the carcass 200 due to the wrapping of the leno tape 310 around the carcass 200. It is the first and second warp yarns 311 and 313 that provide most of the reinforcement of the leno cap ply layer 300.

The first warp yarn 311 and the second warp yarn 313 are made of different materials such that the second warp yarn 313 has a force of elongation of between about 1% and 40% of the force of elongation of the first warp yarn 311, the second warp yarn has an elongation at break of greater than 2% and is in tension. Force of elongation is the force needed to elongate the yarn by a fixed amount, or the slope of the stress-strain curve. In a preferred embodiment, the second warp yarn 313 has a force of elongation of between about 1.5% and 20% of the first warp yarn 311 force of elongation. Once woven, the two warp yarns have different amounts of crimp, the second warp yarn has less crimp than the first warp yarn. As can be seen in FIG. 4, when woven the second warp yarn 313 has much less crimp than the first warp yarn 311.

One way of accomplishing this is to weave the two warp yarns at different tensions with the second warp yarn at a much higher tension than the first warp yarn 311. This may be accomplished, for example, by using a two-beam leno weave machine. Other ways include, but are not limited to changing the tension on the warp yarns and cap ply layer during dipping, resin treatment, and heat setting. When the leno tape is subsequently subjected to a tensile force, the second warp yarn 313 elongates until the crimp is removed and first yarn 311 is as shown in FIG. 5 in the leno tape 310.

During manufacture of the tire, the leno tape 310 is wound around the carcass. A small amount of elongation is necessary for various processes in the manufacture of the tire, such as so that the cap ply wrapped carcass may be removed from the mandrel where it was wound. The elongation properties of the leno tape 310 accommodate the minor amount of stretching needed for the tire manufacturing process. Preferably, this elongation is about 2%. After the wrapped carcass is taken off the mandrel the leno tape 310 is stretched such that the first warp yarn 311 is straightened and a side view of the fabric resembles FIG. 5. The increase in force per percent elongation after the transition location is needed to form a structurally sound pneumatic tire.

The first warp yarn 311 is selected such that the yarn provides the desired strength of the leno cap ply layer 300 to prevent the belt ply 230 from moving outward in the tire 100 and to protect the rubber in the tire 100 from sharp portions of the belt plies 230. The first warp yarns 311 can be multifilament yarns and are formed of a material which will restrain the belt plies 230. The first warp yarns preferably have a modulus of between about 25 and 153 GPa, more preferably about 50 to 110 GPa. Yarns with lower modulus might for desired for strength, but may not be desired in some applications because of their large profile. In one preferred embodiment, the first warp yarn 311 comprises aramid. Preferably, the first warp yarn has between about 80 and 300 twists per meter, more preferably about 100 to 250 twists per meter. Varying the twists per meter can affect the force per elongation.

In one embodiment, the first warp yarns 311 may be hybrid yarns. These hybrid yarns are made up of at least 2 fibers of different fiber material (for example, cotton and nylon). These different fiber materials can produce hybrid yarns with different chemical and physical properties. Hybrid yarns are able to change the physical properties of the final product they are used in. Some preferred hybrid yarns include an aramid fiber with a nylon fiber, an aramid fiber with a rayon fiber, and an aramid fiber with a polyester fiber. In one embodiment, the hybrid first yarn 311 being aramid combined with nylon, rayon, or polyester is paired with a thinner second yarn 313 of a lower modulus yarn such as nylon or polyester. The properties of the hybrid first yarns 311 have the same as the yarns forming them, but the combination of the two types of yarns gives a specific force elongation curve. For the hybrid first yarns 311, the higher the amount of twist in the yarn, the flatter the elongation curve.

The second warp yarn 313 provides a crimp in the first warp yarn 311 of the leno tape 310 for manufacturability (with the crimp essentially becoming zero once the cap ply wrapped carcass is removed from the mandrel). The second warp yarn 313 in one embodiment has a modulus of between 5 and 10 GPa. Preferably, the second warp yarn is a nylon (including nylon 6, nylon 6,6, nylon 4,6, nylon 4,10). The second warp yarn 313 preferably has between about 80 and 300 twists per meter, more preferably about 100 to 250 twists per meter.

In one embodiment, the second warp yarns 313 may be hybrid yarns. These hybrid yarns are made up of at least 2 fibers of different fiber material (for example, cotton and nylon). These different fiber materials can produce hybrid yarns with different chemical and physical properties. Hybrid yarns are able to change the physical properties of the final product they are used in. Some preferred hybrid yarns include an aramid fiber with a nylon fiber, an aramid fiber with a rayon fiber, and an aramid fiber with a polyester fiber.

The weft yarns 312 hold the warp yarns 311 and 313 in the desired spaced apart relationship. The weft yarn 312 can be a spun staple yarn, a multifilament yarn, and/or a monofilament yarn. Preferred examples of suitable materials for the weft yarns 312 include cotton, rayon, polyester, polyamide, aramids (including meta and para forms), nylon, polyvinyl acetate, polyvinyl alcohol, nylon (including nylon 6, nylon 6,6, and nylon 4,6), PBO, and PEN.

The leno tape 310 is constructed with a width preferably of about 5 to 25 millimeters. More preferably, the leno tape 310 is constructed with a width of about 7 to 15 millimeters. It is important to form a uniform flat layer of the leno tape 310 across the surface of the carcass 200 of the tire 100. The width of the leno tape 310 affects this property. If the leno tape 310 is used in a helical wrapping process, wider strips will cause buckles on the leading edge of the wrap due to excessive width of the materials. Shorter widths provide difficulties in manufacturing the tire 100 due to an excessive number of revolutions necessary in the wrapping procedure to achieve the desired coverage of the carcass 200 with the leno tape 310.

The leno tape 310 is an open construction fabric which permits the strike through of the rubber in the tire 100 for a better bonded construction. The openness of the fabric used for the leno tape 310 is usually determined by the spacing and character of the first and second warp yarns 311 and 313. The weft yarns 312 are typically spaced as necessary to maintain the position of the warp yarns 311 and 313. Preferably, the fabric has 40-75 warp pairs per decimeter and 10 to 30 weft pairs per decimeter, the first warp yarns are 1100/2 dtex aramid, the second warp yarns are 470/1 dtex nylon, and the weft yarns are 1220/1 dtex rayon. In one embodiment, the openings formed by the warp yarns and weft yarns are such that the openings will be within about ±5% of the mean opening size.

In another embodiment where the fabric is a 54 warp/22 weft per decimeter fabric with the same materials as described above, the pairs of warp yarns 311, 313 are spaced about 0.95 millimeters apart and the weft yarns 312 are spaced about 3.66 millimeters apart to provide a mean opening size of 3.48 mm². In yet another embodiment where the fabric is a 20 warp/10 weft per decimeter fabric with the same materials for the yarns, the pairs of warp yarns 311 and 313 are spaced about 4.31 millimeters apart and the weft yarns 312 are spaced about 9.94 millimeters apart to provide a mean opening size of 42.84 mm². In yet another embodiment where the fabric is a 75 warp/30 weft per decimeter fabric with the same materials for the yarns, the pairs of warp yarns 311 and 313 are spaced about 0.43 millimeters apart and the weft yarns 312 are spaced about 2.36 millimeters apart to provide a mean opening size of 1.01 mm².

If the leno tape 310 is used in a flat helical pattern, the pattern typically will need more than three full revolutions of the leno tape 310 around the carcass 200 of the tire 100. The length of leno tape 310 will depend on the diameter of the tire 100, the width of the leno tape 310, and the amount of coverage provided by the leno tape 310. The approximate minimum length of a leno tape 310 in a leno cap ply layer 300, with only one layer of leno tape 310 and no gaps or overlapping regions, can be calculated according to the following formula:

$$\text{length} = 2\pi rw/t$$

where $\pi$ is 3.14, r is the radius of the tire, w is the width of the area of the tire to be covered, and t is the width of the tape. As an example, for a 185/60/R14 tire, the length of a 13 millimeter wide leno tape 310 would be a minimum of about 15 linear meters in length, and can have an additional amount of about 2-3 meters for overlapping itself in the shoulder area.

Greater strength can be built into the leno tape 310 by constructing the leno tape 310 such that the first and second warp yarns 311 and 313 of the outermost warp yarn pairs in the leno tape 310, run longitudinally for the length of the leno tape 310 as continuous uncut yarns. Even greater strength can be built into the leno tape 310 by constructing the leno tape 310 with all of the first and second warp yarns 311 and 313 run longitudinally the length of the leno tape 310 as continuous uncut yarns.

The leno tape 310 can preferably be treated with an adhesion promoter. Typical examples of adhesion promoters included resorcinol formaldehyde latex (RFL), isocyanate based material, epoxy based material, phenolic resins, and materials based on melamine formaldehyde resin.

Preferably, the leno tape 310 is located edge to edge as it is laid on the carcass 200 of the tire 100, and is wrapped around the entire belt ply 230 area of the tire 100. In one embodiment, the leno tape 100 is wrapped around the carcass 200 of the tire 100 such that the leno cap ply layer 300 extends beyond the edges 232 of the belt plies 230, under the shoulder 108 area of the tire 100. Overlapping the edge 232 of the belt 230 with the leno tape 310 provides support to the edges 232 of the belt 230 where excessive temperature can build up.

Additionally, the leno cap ply layer 300 can comprises multiple layers, e.g. two, three, or even more layers, of the leno tape 310 that are wound over the ply layer 230 of the carcass 200 to provide extra strength. In one embodiment, the leno tape 310 is laid into a double layer in the shoulder 108 area of the tire 100, providing additional strength at the edges 232 of the belt 230. In another embodiment, the leno cap ply layer 300 can have two layers of leno tape 310 securing the belt ply 230 across the width of the tire 100. When more than one layer of leno tape 310 is used for the cap ply 300, a layer of unvulcanized rubber is placed between the layers of leno tape 310 to insure a good bond. Also, in an embodiment where multiple layers of the leno tape 310 are used, the layers of leno tape 310 can be staggered so that upper strips of leno tape 310 cover the edges of the leno tape 310 in the lower layer.

The leno cap ply layer 300 of the present invention can be used with one belt ply, two belt plies (as illustrated in FIGS. 1 and 2), or more than two belt plies below the leno cap ply layer 300. In an alternate embodiment of the present invention illustrated in FIG. 6, the tire 100 can have multiple belt plies 230 and 250 with leno cap ply layers 300 and 350, disposed over each belt ply layer creating alternating layers of belt plies and cap plies. In the alternate embodiment, the leno cap ply layer 300 can also overlap the edge of the underlying belt ply, and/or have multiple layers of leno tape 310 (which can also be staggered so that upper strips overlap edges on lower strips).

The formation of the leno tape 310 begins with the acquisition of the basic yarns for the fabric. Subsequently, the yarns are twisted to provide additional mechanical resilience. After the twisting, first warp yarns 311 and the second warp yarns 313 are placed on a two beams for the formation of the fabric. The fabric is formed by leno weaving with the appropriate spacing of the warp yarn pair weaving with the second warp yarns 313 usually in much higher tension than the first warp yarns 311. The fabric is formed in large widths, such as 61.4 inches. After the fabric formation, the fabric may be finished with one or more compositions. The fabric may be treated with an RFL composition 400. The fabric may be finished with tacky finish 600. Tacky finish 600 may be applied to the fabric before the fabric slitting process, or it may be applied to the leno tape 310 (after the fabric has been slit into tape). The fabric may be treated with an RFL composition 400 and subsequently with the tacky finish 600.

The final fabric is slit into the specific leno tape 310 widths for placement on a spool. Cross-winding the leno tape 310 across a cardboard tube provides a convenient package for subsequent removal of the leno tape 310 in the manufacturing process of tire 100.

In the tire formation process, the tire carcass 200 is formed with the tire cord 210, metal beads 220, and belt plies 230. After the tire carcass 200 is formed, the leno tape 310 is wound from the package around the belt plies 230 to form the leno cap ply layer 300. After the leno cap ply layer 300 is placed on the tire carcass 200, the wrapped carcass is removed and the leno cap ply layer is stretched approximately 2% making the first warp yarns 311 have essentially no crimp. The tread 500 is then molded onto the subassembly, and the tire 100 is completed.

The present invention overcomes the difficulties of the prior art. Because of the flat helical pattern of the leno tape, there is no overlap area that extends across the width of the tire. Also, the leno tape is wrapped around the circumference of the tire many times, providing a stronger reinforcement to the belt ply. Furthermore, leno weave of the tape secures the warp yarns to the weft yarns, providing a greater resistance to the separation of the warp yarns.

In the present invention, and as illustrated in FIG. 7, RFL composition 400 may be applied to at least one surface, and in some embodiments, to both surfaces of leno tape 310 to form an RFL-leno tape composite. Following application of the RFL composition 400 to leno tape 310, the tacky finish 600 may be applied to at least one surface of the RFL-leno tape composite. Thus, RFL composition 400 and tacky finish 600 may independently applied to at least one surface of the leno tape 310 (or to the fabric that forms the leno tape 310, prior to being slit into tape), in order to help adhere leno tape 310 to the tread layer 500 and/or the belt ply layer 230. Additionally, the fiber and/or yarn may include an adhesion promotion finish applied during the fiber or yarn manufacturing process. The adhesion promotion finish may include a fiber lubricant, an antistatic compound and a reactive adhesion promoter. Any fiber lubricants and antistatic compound known to those skilled in the art may be used. The reactive adhesion promoter may include, for example, at least one of an epoxy resin including aliphatic epoxy resin, novolac epoxy resin, bisphenol A based epoxy resin, organofunctional silanes (such as aminofunctional alkoxylsilanes, vinyl-, acryloxyl or methacryloxyl-silanes, isocyanato-silanes), and an isocyanate compound. In one embodiment, a polyester yarn having an epoxy containing adhesion promotion finish may be used to form the textile material. Additionally, the fiber and/or yarn may be exposed to a plasma treatment or a corona treatment process, in order to create additional reactive groups on the surface of the fiber.

Textile Material

Several specific embodiments of the leno tape and leno cap ply layer(s) have been described herein in relation to the Figures. In addition, textile materials, such as fabrics, treated with the tacky finish and/or RFL composition of the present invention may be characterized as having a woven (e.g. leno weave or laid scrim), nonwoven, or knit (e.g. warp knit, weft inserted warp knit, or raschel knit) construction. Fiber types comprising the textile material include synthetic fibers, natural fibers, and mixtures thereof. Synthetic fibers include, for example, polyester, acrylic, polyamide, polyolefin, polyaramid, polyurethane, regenerated cellulose (i.e., rayon), and blends thereof. The term "polyamide" is intended to describe any long-chain polymer having recurring amide groups as an integral part of the polymer chain. Examples of polyamides include nylon 6; nylon 6, 6; nylon 1, 1; and nylon 6, 10. The term "polyester" is intended to describe any long-chain polymer having recurring ester groups. Examples of polyesters include aromatic polyesters, such as polyethylene terephthalate (PET), polybutylene terephthalate (PBT), polytrimethylene terephthalate (PTT), and polytriphenylene terephthalate, and aliphatic polyesters, such as polylactic acid (PLA). "Polyolefin" includes, for example, polypropylene, polyethylene, and combinations thereof. "Polyaramid" includes, for example, poly-p-phenyleneteraphthalamid (i.e., Kevlar®), poly-m-phenyleneteraphthalamid (i.e., Nomex®), and combinations thereof. Natural fibers include, for example, wool, cotton, flax, and blends thereof.

The textile material may be formed from fibers or yarns of any size, including microdenier fibers and yarns (fibers or yarns having less than one denier per filament). The fibers or yarns may have deniers that range from less than about 1 denier per filament to about 2000 denier per filament or more preferably, from less than about 1 denier per filament to about 500 denier per filament, or even more preferably, from less than about 1 denier per filament to about 300 denier per filament.

Furthermore, the textile material may be partially or wholly comprised of multi-component or bi-component fibers or yarns, which may be splittable, or which have been partially or fully split, along their length by chemical or mechanical action. The textile material may be comprised of fibers such as staple fiber, filament fiber, spun fiber, or combinations thereof.

The textile material may optionally be colored by a variety of dyeing techniques, such as high temperature jet dyeing with disperse dyes, vat dyeing, thermosol dyeing, pad dyeing, transfer printing, screen printing, or any other technique that is common in the art for comparable textile products.

Tacky Finish

One or more layers of textile material may have a tacky finish applied to at least one surface of the textile material. For example, the leno tape 310 may have a tacky finish applied thereto for facilitating adhesion, or green tack, during the building process of the green (unvulcanized) tire. While specific selection of materials for the tacky finish may be somewhat dependent upon the materials selected for use in the tire, there are several classes of materials that are suitable.

The tacky finish may include a mixture comprising an unvulcanized rubber, an adhesion promoter, a tacky resin, and optionally, a heat or oxidation stabilizer. The tacky finish or coating may be applied to the fabric as an aqueous blend of the components as mentioned above or, as an organic solvent solution. The water and/or organic solvent may be subsequently removed by drying, to leave a tacky coating or finish on the textile substrate. Tacky finishes may be applied using various methods such as coating, impregnating, printing or any other chemical application method known to those skilled in the art.

The tacky finish is comprised of at least one tacky resin (or "tackifier"). Tacky resins may be selected from the group consisting of phenol-containing resins (such as phenol formaldehyde resin, resorcinol formaldehyde condensate, condensate of phenol derivatives with aldehydes and acetylene, terpene phenolic resins, and the like; one commercially available example is Koresin® from BASF, which is made from the reaction of acetylene and t-butyl phenol), aromatic resins, hydrocarbon resins, terpene resins, indene resins, coumarone resins, rosin-based resins, and mixtures thereof. Hydrocarbon resins include aliphatic hydrocarbon resins prepared from monomer(s) having a chain length of five carbon atoms, aromatic hydrocarbon resins prepared from monomer(s) having a chain length of nine carbon atoms, dicyclopentadiene ("DCPD") hydrocarbon resins, cycloaliphatic ("CPD") resins, hydrogenated hydrocarbon resins, and mixtures thereof.

Rosin-based resins may be selected from gum rosin, wood rosin, tall oil resin, and mixtures thereof. Rosin based resin may include rosin acid resins, rosin ester resins and hydrogenated rosin ester resins. Various mixtures or blends of different tacky resins may used to provide a specific tack characteristic. In one embodiment, a phenol tacky resin is combined with a rosin ester resin. In another embodiment, a hydrocarbon resin is combined with a rosin ester resin. In yet another embodiment, a phenolic tacky resin is combined with a hydrocarbon resin. Various esters of rosin may be combined to form a tacky resin. Rosin ester resins may be preferred. Resin compositions that contain a 1:1 ratio of indene-coumarone resin may also be preferred.

Unvulcanized rubber includes any polymeric material having unsaturated carbon-carbon bonds that are capable of crosslinking with each other. Exemplary unvulcanized rubbers includes polybutadiene, polyisoprene, synthetic trans-rich polyisoprene or cis-rich polyisoprene, natural rubber, poly(styrene-co-butadiene), poly(acrylonitrile-co-butadiene), chloroprene, hydrogenated styrene-butadiene rubber, hydrogenated nitrile-butadiene rubber, butyl rubber (polyisobutylene copolymers), halo-butyl rubber, and mixtures thereof. The rubber may be in the form of latex, emulsion, or solvent solution before combined with other components and subsequently applied to a textile material. The unvulcanized rubber, after being applied to a textile material, can be further vulcanized (crosslinked) in the presence of a curing agent or by virtue of being in contact with another rubber compound comprising a curing agent. The curing agent may be a sulfur-based curing agent, organic peroxide, or other chemical agent that can cause effective crosslinking (curing) of the rubber material. RFL compositions may be incorporated in the formulation for crosslinking purposes. Detailed information on curing agents and other additives that may be included with the unvulcanized rubber may be found in Vanderbilt Rubber Handbook. Natural rubber (particularly natural rubber latex), and mixtures comprising natural rubber latex and polybutadiene, may be preferred. Furthermore, a combination of VP latex with natural latex may be preferred.

Adhesion promoters include any materials that can improve the adhesion between the tacky finish and the textile material and/or the adhesion between the tacky finish and a fully compounded rubber. Exemplary adhesion promoters may include at least one of formaldehyde-resorcinol condensate and/or resin, formaldehyde-phenol condensate, novolac resins, resole resins, multifunctional epoxy resin, novolac modified epoxy resin, isocyanate compounds, blocked isocyanate resin or compounds, halogenated resorcinol-formaldehyde resin, phenolic resins, halogenated phenolic resins, melamine-formaldehyde resins, vinylpyridine rubber latex, methylene donors such as hexamethylenetetramine, hexamethoxymethylmelamine, formaldehyde, glyoxal, maleated polybutadiene, maleated styrene-butadiene copolymer, and mixtures thereof. Vinylpyridine rubber latex is as described further herein. Additionally, silica, carbon black, and organofunctional silanes may be further included in the tacky finish.

The unvulcanized rubber, tacky resin and adhesion promoters can be combined at any proportions to provide a desired tack and cured adhesion to a rubber compound. In one embodiment, parts of unvulcanized rubber to parts of tacky resin may range from 50:1 to 50:50, 50:2 to 50:40, 50:4 to 50:30, 50:4 to 50:20, and 50:4 to 50:10 by dry weight. The ratio of parts unvulcanized rubber to parts adhesion promoter may range from 50:0.5 to 50:20, 50:1 to 50:10, and 50:1 to 50:8.

The tacky finish may be applied to the textile material at a dry weight range from about 5 $g/m^2$ to 100 $g/m^2$, 5 $g/m^2$ to 50 $g/m^2$, or 5 $g/m^2$ to 25 $g/m^2$. The add-on of tacky finish may be about 2% to 40%, 5% to 30%, or 7% to 20% of the textile material by weight.

The tacky finish may be applied to the textile material in the form of aqueous dispersion and/or emulsion, and in the form of solution in an organic solvent. The solvents may be selected from the group consisting of toluene/hydrocarbon solvents, xylene, ethyl acetate, alcohols, ethers, and mixtures thereof. After applied to the textile material, the textile material may be dried to remove water or organic solvent to form a treated textile material. The textile material may be dried at a temperature between about 40° C. to about 150° C., or 60° C. to about 140° C. for a sufficient amount of time to remove at least most of the solvent or water.

Resorcinol-Formaldehyde-Latex ("RFL") Composition

Any well known RFL composition may be utilized separately or in combination with the tacky finish of the present invention. When used in combination, the RFL composition and the tacky finish may be applied to the textile material together in a one-step application process, or they may be added sequentially in a two-step application process. RFL compositions as taught in U.S. Pat. Nos. 6,096,156 and 6,497,954, both to Morin et al., may be utilized. RFL compositions are well known to the ordinarily skilled practitioner within the pertinent art and include combinations of resorcinol and formaldehyde in varying ratios and at varying temperatures and pH levels and solids. Typical RFL composition includes formaldehyde, a rubber latex, and either resorcinol or resorcinol-formaldehyde condensate. In principle, any type of latex can be used to make the RFL composition. Exemplary rubber lattices may include, but not limited to, vinylpyridine rubber latex, styrene-butadiene rubber latex, chloroprene rubber latex, nitrile rubber latex, hydrogenated rubber latex, and any mixtures thereof. Furthermore, such resorcinol and formaldehyde compositions are combined with any number of rubber latex compounds and other additives, including, as merely examples, epoxies, urethanes, and the like. Such RFL compositions are well known in the art and the utilization of such types of compositions (any number of which may be used in combination with the tacky finish) would be well appreciated by the ordinarily skilled artisan in the textile/rubber reinforcement composite art.

In one embodiment, the RFL composition may preferably and optionally include a tacky resin.

Any tacky resin as described herein may be included in the RFL composition. The tacky resin may be included at 2%-50%, 2%-30%, 5%-20%, or 8%-20% by weight based on the total dry weight of the RFL formulation. For example, a hydrocarbon tacky resin, a rosin ester resin or mixture thereof may be further included in a RFL composition at about 10%-18% based on the total dry weight of the formulation.

One particularly preferred RFL composition comprises the epoxy adhesive composition of U.S. Pat. No. 5,565,507 to Marco et al. This RFL composition is an aqueous dispersion of an epoxy resin and a functionalized rubber latex. The epoxy resin has an epoxy functionality of three or greater. A large number of commercially available epoxy resins are available and by way of example and not limitation, include epoxy cresol-novolac resins; epoxy phenol-novolac resins; poly nuclear phenol-glycidyl ether-derived resins, such as the tetraglycidyl ether of tetrakis(4-hydroxyphenyl) ethane; resins containing an aromatic amine backbone, such as triglycidyl p-aminophenol-derived resins and triglycidyl triazine-derived resins such as triglycidyl isocyanurate. Preferably, the epoxy resin is a cresol-novolac or phenol-novolac resin.

To enhance the stability of the RFL composition, it may be desirable to select epoxy resins having an average particle size of less than 5 microns, preferably less than 3 microns, and most preferably about 1 micron or less. Typically, the molecular weight of the cresol-novolac and phenol-novolac epoxy resins range from about 475 to 1750, with 650 to 1500 being preferred. Also included are trifunctional epoxy resins which have been modified to enhance their dispersability such as by grafting acrylic monomers to the epoxy resin backbone.

The functionalized rubber latex may be generally characterized as a rubber latex having pendant carboxyl, amide, or pyridyl functionalities, and such functionalities are intended to include derivatives thereof. Also included are rubber lattices which contain combinations of one or more of these functionalities. The functionalized rubber lattices are typically produced by copolymerization of a conjugated diene, and ethylenically unsaturated monomer containing one of the aforementioned functionalities, and optionally, compatible monomers, such as those used in elastomer copolymers.

Suitable dienes include conjugated dienes having from 4 to 9 carbon atoms such as 1,3-butadiene, 2-methyl-1,3-butadiene, 2-ethyl-1,3-butadiene, 2,3-dimethyl-1,3-butadiene and halogen-substituted butadienes, such as 2-chloro-1,3-butadiene.

As is well known in the art, compatible comonomers may also be included for copolymerization in the rubber lattices. For example, aromatic vinyl compounds, such as styrene, α-methylstyrene, 2-methylstyrene, 3-methylstyrene, 4-methylstyrene, 2,4-di-isopropylstyrene, 2,4-dimethylstyrene, 4-t-butylstyrene, 5-t-butyl-2-methylstyrene, monochlorostyrene, dichlorostyrene, monofluorostyrene and hydroxymethylstyrene may be employed. Another class of compatible monomers includes cyanated vinyl monomers such as acrylonitrile, methacrylonitrile, fumaronitrile, and maleonitrile. Still another class of compatible monomers includes aliphatic vinyl compounds, such as ethylene, propylene, and vinyl chloride. The amount of the compatible monomer in the rubber latex is generally 55% by weight or less.

Monomers which may be polymerized into the rubber latex to provide a carboxyl functionality may include ethylenically unsaturated carboxylic acids, such as acrylic acid, methacrylic acid, crotonic acid, cinnamic acid, itaconic acid, fumaric acid, maleic acid and butene tricarboxylic acid; monoalkyl esters of ethylenically unsaturated dicarboxylic acids; and ethylenically unsaturated acid anhydrides, which may be hydrolyzed to the corresponding carboxylic acid.

The carboxyl functionalized monomer is typically provided in the functionalized rubber latex in a range of 0.1 to 25 wt %, preferably 0.5 to 12 wt %, most preferably 1 to 7 wt %. These compounds, generally referred to as carboxylated rubber lattices, are well known and commercially available, such as Tylac NP-1672®, available from Reichold Chemical Company as a 70% solid carboxylated styrene/butadiene polymer dispersion in water.

Suitable functionalized monomers for providing a pyridyl functionality include vinylpyridines, such as 2-vinylpyridine, 3-vinylpyridine and 4-vinylpyridine as well as alkyl derivatives thereof such as 2-methyl-5-vinylpyridine and 5-ethyl-2-vinylpyridine, 2-methyl-6-vinylpyridine and 2-ethyl-4-vinylpyridine.

The pyridyl functionalized monomer is generally provided in the functionalized rubber latex in the amount of 5 to 45 wt %, preferably 10 to 30 wt %. Vinylpyridine/rubber latex copolymers are commercially available, such as Pliocord LVP-4668™ from Goodyear Chemical Company which is a 40% solids dispersion in water of styrene/butadiene/vinylpyridine in the approximate weight ratio of 45:45:10.

Another class of functionalized monomers includes ethylenically unsaturated compounds having a pendant amide or amide derivative group. Useful monomers include acrylamide and N-methylolacrylamide. These compounds may be employed in free radical, emulsion polymerization with the conjugated diene monomers and optional compatible monomers, such as disclosed in Kirk-Othmer Encyclopedia of Chemical Technology, 3rd Edition, Volume 14, page 82 on "Latex Technology". The amide functionalized monomer may be employed effectively in amounts of from 0.1 to 30 wt % in the functionalized rubber latex.

Also included are RFL compositions containing functionalized rubber lattices having both pendant carboxyl and pyridyl groups, or derivatives thereof. For example, Hisaki et al., U.S. Pat. No. 5,286,783, discloses a copolymer latex obtained by emulsion polymerization of from 45 to 85% of a conjugated diene monomer, 0.1 to 25% of an ethylenically unsaturated acid monomer, 10 to 45% of a vinylpyridine monomer and up to 30% other comonomers, such as aromatic vinyl compounds.

The relative concentration of the epoxy resin and functionalized rubber latex in the RFL composition may range from 1:15 to 4:1, preferably 1:4 to 1:1. In an alternate embodiment, the RFL composition contains an epoxy resin and both a carboxylated rubber latex and a pyridyl functionalized rubber latex. Optimum adhesion between a reinforcing textile and rubber product may be achieved when the RFL composition contains the following relative concentration of components: from 7-60 wt % epoxy resin, from 5-65 wt % carboxylated rubber latex, and from 15-75 wt % pyridyl functionalized rubber latex; preferably, from 15-50 wt % epoxy resin, from 10-50 wt % carboxylated rubber latex, and from 20-65 wt % pyridyl functionalized rubber latex; most preferably, from 25-40 wt % epoxy resin, from 15-30 wt % carboxylated rubber latex, and from 35-55 wt % pyridyl functionalized rubber latex.

Unvulcanized rubber materials may further be used in the RFL composition. Unvulcanized rubber includes any polymeric material having unsaturated carbon-carbon bonds that are capable of crosslinking with each other. Exemplary unvulcanized rubbers includes polybutadiene, polyisoprene, synthetic trans-rich polyisoprene or cis-rich polyisoprene, natural rubber, poly(styrene-co-butadiene), poly(acrylonitrile-co-butadiene), chloroprene, hydrogenated SBR, hydrogenated NBR, butyl rubber (polyisobutylene copolymers), halo-butyl rubber, and mixtures thereof. The rubber may be in the form of a latex, emulsion or solvent solution before combined with other components and subsequently applied to a textile material. The unvulcanized rubber, after being applied to a textile material, can be further vulcanized (crosslinked) in the presence of a curing agent or by virtue of being in contact with another rubber compound comprising a curing agent. The curing agent may be a sulfur based curing agent, organic peroxide, and other chemical agent that can cause effective crosslinking (curing) of the rubber material. Natural rubber (particularly natural rubber latex), and mixtures comprising natural rubber latex and polybutadiene may be preferred.

The RFL composition is generally aqueous with a solids content of from 2 to 60, preferably 7 to 40 wt %. In addition to the epoxy resin and functionalized rubber latex or lattices, the RFL composition may contain minor amounts of additional additives. For example, the aqueous portion of the RFL composition may contain minor amounts of hydrophilic solvents, such as methanol.

The aqueous RFL composition may be applied to a textile to give an add-on of from 1 to 30 wt % solids based on a weight of the untreated textile, preferably 5 to 15 wt % solids. Any of a number of techniques, as are well known in the art, can be employed, such as dipping, spraying, or application from a kiss roll. In one embodiment, a woven fabric is dip-coated by immersion in the aqueous RFL composition at ambient conditions.

Additionally, the curing step between the RFL-coated textile and the rubber compound is performed in any conventional manner, such as through heat-activated vulcanization in the presence of a curing agent (such as organic peroxide). Again, such a step should be well within the purview of the ordinarily skilled artisan in this field. Additional adhesive compositions and methods of application which may be useful are provided in U.S. patent application Ser. No. 12/661,170, "Pattern Coated Cap Ply For Tire Construction," to Michiels et al., filed Mar. 11, 2010; U.S. Pat. No. 6,602,379 to Li et al.; U.S. Pat. No. 6,046,262 to Li et al.; U.S. Pat. No. 6,333,281 to Li et al.; U.S. Pat. No. 6,444,322 to Li et al.; U.S. Pat. No. 6,686,301 to Li et al.; U.S. Pat. No. 6,346,563 to Li et al.; all of which are entirely incorporated by reference herein.

Optional Additives

Optional additives that may be included in the tacky finish of the present invention. Optional additives may include stabilizers (such as diphenylamine-based stabilizers; heat stabilizers such as mica and quartz), antioxidants (such as phenolic-based antioxidants, such as hindered phenolic antioxidants or hindered phenolic antioxidants with thio synergist; and hydroquinoline compounds), electrical discharge dissipaters, ozone and ultraviolet stabilizers (such as Hydrowax Q—solid saturated hydrocarbons), wetting agents, emulsifiers, adhesion promoters, and mixtures thereof. Antioxidants may include hindered phenol compounds, acylphenylenediamine compounds, diphenylamine compounds, mercaptan compounds, thioester compounds, thioether compounds, hydroquinoline compounds, and mixtures thereof. Adhesion promoters may include isocyanate-containing compounds, epoxy-containing compounds, resorcinol-formaldehyde resins, hexamethoxymethyl melamine ("HMMM") resins, and mixtures thereof. Carbon black and silica may also be included as optional additives in the tacky finish.

Method for Applying the Tacky Finish to the Textile Materials

The tacky finish may be applied to a textile material through any technique known in the art for applying a chemical mixture to a substrate. For example, the tacky finish may be applied to the textile material via spraying, dipping, padding, foaming, printing, coating, and the like. The use of engraved rollers, a three roller system, a rotary screen, and/or a double-sided vertical system may be employed in the application process. One exemplary acceptable method of applying the tacky finish to a textile material includes padding the tacky finish from a bath mixture, which generally results in coating both surfaces of the textile material in one step. By using one or more of these application techniques, the tacky finish may be applied to only one surface of a textile material, or it may be applied to both surfaces. The tacky finish may be applied in a uniform or in a non-uniform manner to at least one surface of the textile material.

The coated textile material may comprise a textile material having an RFL first layer disposed on at least one surface of the textile material and a tacky finish/coating layer disposed on the RFL layer. The coated textile material may exhibit a fabric-to-fabric tack level in the range of about 5 Newtons and about 30 Newtons, in the range of about 10 Newtons and about 30 Newtons, or in the range of about 5 Newtons and about 20 Newtons, as determined by the Tacky Level Test Procedure described herein.

Additional details of tire construction and/or cap ply layers and/or RFL compositions and methods for making are provided in US Patent Application Publication No. 2009/0294008 to Michiels et al., "Leno Cap Ply For Pneumatic Tire," filed May 29, 2008; US Patent Application Publication Nos. 2009/0294010 and 2009/0294025, both to Michiels et al., "Leno Cap Ply For Pneumatic Tire," filed May 5, 2009; U.S. Pat. No. 4,739,814 to Berczi et al., U.S. Pat. No. 5,365,988 to Soderberg et al.; U.S. Pat. No. 7,252,129 to Michiels et al.; U.S. Pat. No. 7,614,436 to Ternon et al.; all of which are entirely incorporated by reference herein.

EXAMPLES

The invention may be further understood by reference to the following examples which are not to be construed as limiting the scope of the present invention.

A. Fabric Preparation

Fabric A was a knitted fabric having 1400/2 dtex polyamide (nylon 6,6) fiber and 82/1 dtex low shrink polyester fiber in the warp direction and 1220/1 dtex rayon fiber in the fill direction. The warp yarn contained about 49 ends/decimeter and the fill yarn contained about 22 picks/decimeter. Fabric A had a fabric weight of 246.6 g/m$^2$. Fabric A treated with the tacky finish of the present invention exhibited an elongation at 80 daN (warp) of 3.5%, an elongation at break (warp) of 22.1%, and an elongation at break (weft) of 18.0%, all of which was determined using test method DIN 53857 (MTP 11 without feelers), as described herein.

Fabric B was a leno weave fabric having 940/1 dtex polyamide (nylon 6,6) fiber in the warp direction and 1220/1 dtex rayon fiber in the fill direction. The warp yarn contained about 108 (54×2) ends/decimeter and the fill yarn contained about 23 picks/decimeter. Fabric B had a fabric weight of 185 g/m². Fabric B treated with the tacky finish of the present invention exhibited an elongation at 80 daN (warp) of 8.5% and an elongation at break (weft) of 15.0%, all of which was determined using test method DIN 53857 (MTP 11 without feelers), as described herein.

B. Formulations

The amount of each ingredient for each formulation is provided in grams. Reference ("REF") samples are provided as controls.

Table A is a list of products and their description that may be applied, in various combinations, to at least one fabric as described herein.

TABLE A

| \multicolumn{4}{c}{Products Useful in Preparing the Tacky Finish} |
| Name | Description | Distributor/Manufacturer | Chemical Name |
|---|---|---|---|
| Dermulsene ™ 222 | Tackyfier | DRT | Aqueous, solvent free resin based on terpene and stabilized rosin ester |
| Dermulsene ™ A 7510 | Tackyfier | DRT | Aqueous, solvent free resin based on stabilized resin |
| Dermulsene ™ HBR 803 | Tackyfier | DRT | Aqueous, solvent free resin, manufactured at 53% sold. Based on hybrid rosin ester/hydrocarbon resin |
| Dermulsene ™ RE 802 | Tackyfier | DRT | Aqueous, solvent free resin based on stabilized rosin ester |
| Dermulsene ™ TR 602 | Tackyfier | DRT | Aqueous resin dispersion based on terpene phenolic resin |
| Snowtack ™ 100 G | Tackyfier | Hexion | Aqueous dispersion of modified rosin |
| Snowtack ™ 779 F | Tackyfier | Hexion | Aqueous dispersion of modified rosin |
| Snowtack ™ SE 780 G | Tackyfier | Hexion | Aqueous dispersion of modified rosin; mixture of rosin ester and $C_5$-$C_9$ coreacted hydrocarbon resin |
| Snowtack ™ SE 780 K | Tackyfier | Hexion | Aqueous dispersion of modified rosin |
| Hydro-Rez ™ 1100 D | Latex | Hexion | A 33% solids pH neutral film forming sulfo polyester resin dispersion |
| Hydro-Rez ™ 1400 D | Latex | Hexion | A 30% solids pH neutral film forming sulfo polyester resin dispersion |
| Hydro-Rez ™ 800 E | Latex | Hexion | A 44% solids water-based acrylic dispersion special developed for water-based |
| Norsolene ® S 125 E | Tackyfier | Necarbo | Thermoplastic resins, obtained by aromatic petroleum cuts polymerization |
| Norsolene ® S 95 | Tackyfier | Necarbo | Thermoplastic resins, obtained by aromatic petroleum cuts polymerization |
| Nuosperse ® FN 265 | Wetting agent & emulsifier | Necarbo | Pigment wetting agent for aqueous systems |
| Wingtack ® 95 | Tackyfier | Necarbo | synthetic resins obtained by cationic polymerization of aliphatic monomers (C5) |
| Pliocord ® SB 2108 | Latex | Eliokem | Aqueous dispersion of a styrene-butadiene copolymer produced using a non nitrosamine forming shortstop. |
| Pliotec ® EL 80 | Latex | Eliokem | 100% acrylic self cross-linking elastomeric resin. |
| Pliotec ® EL 25 | Latex | Eliokem | Elastomeric acrylic latex |
| Wingstay ® 29 | Antioxidant | Eliokem | Mixed para oriented styrenated diphenylamines |
| Wingstay ® L 40 Disp. | Antioxidant | Eliokem | Butylated reaction product of p-cresol and dicyclopentadiene |
| Wingstay ® L | Antioxidant | Eliokem | Butylated reaction product of p-cresol and dicyclopentadiene |
| Struktol ® LA 214 | Antioxidant | Schill&Seilacher | Aqueous dispersion based on hindered and alkylated phenols with a sulphur containing synergist |
| Struktol ® LA 229 | Antioxidant | Schill&Seilacher | Aqueous dispersion of a butylated reaction product of p-cresol and dicyclopentadiene with addition of dispersing agents |
| Struktol ® LA 331 | Antioxidant | Schill&Seilacher | Aqueous dispersion based on hindered and alkylated phenols with a sulphur containing synergist (1:1) and anionic surfactants |
| Struktol ® XP 4400 | Antioxidant | Schill&Seilacher | Anionic, aqueous antioxidant dispersion |
| Struktol ® XP 4402 | Antioxidant | Schill&Seilacher | Anionic, aqueous antioxidant dispersion |
| Struktol ® LT 159 | Tackyfier | Schill&Seilacher | Aqueous dispersion of alkylphenolic resin; Koresin, a reaction product of acetylene and t-butylphenol. |
| Struktol ® LT 356 | Tackyfier | Schill&Seilacher | Aqueous, anionic tackifier resin dispersion; Terpene phenolic resin |
| Struktol ® XP 4392 | Tackyfier | Schill&Seilacher | Aqueous, anionic tackifier resin dispersion; hydrocarbon resin mixture with Koresin |
| Struktol ® XP 4394 | Tackyfier | Schill&Seilacher | Aqueous, anionic tackifier resin dispersion; $C_5$ hydrocarbon resin |
| Struktol ® XP 4395 | Tackyfier | Schill&Seilacher | Aqueous, anionic tackifier resin dispersion based on rosin ester resin |
| Struktol ® XP 4395 - A | Tackyfier | Schill&Seilacher | Aqueous, anionic tackifier resin dispersion based on rosin ester resin having 20% liquid resin content |

TABLE A-continued

Products Useful in Preparing the Tacky Finish

| Name | Description | Distributor/Manufacturer | Chemical Name |
|---|---|---|---|
| Struktol ® XP 4395 - B | Tackyfier | Schill&Seilacher | Aqueous, anionic tackifier resin dispersion based on rosin ester resin having 40% liquid resin content |
| Struktol ® XP 4397 | Resin | Schill&Seilacher | Aqueous, anionic tackifier resin dispersion |
| Struktol ® XP 4398 | Resin | Schill&Seilacher | Aqueous, anionic tackifier resin dispersion |
| Struktol ® XP 4399 | Tackyfier | Schill&Seilacher | Aqueous, anionic tackifier resin dispersion |
| Struktol ® XP 4406 | Tackyfier | Schill&Seilacher | Aqueous, anionic tackifier resin dispersion |
| Struktol ® XP 4407 | Tackyfier | Schill&Seilacher | Aqueous, anionic tackifier resin dispersion |
| Struktol ® XP 4408 | Tackyfier | Schill&Seilacher | Aqueous, anionic tackifier resin dispersion |
| Struktol ® XP 4409 | Tackyfier | Schill&Seilacher | Aqueous, anionic tackifier resin dispersion |
| Struktol ® XP 4410 | Tackyfier | Schill&Seilacher | Aqueous, anionic tackifier resin dispersion |
| Tacolyn ™ 100 | Tackyfier | Eastman | An aqueous, anionic, 50% solids, solvent-free resin dispersion based largely on a low molecular weight, thermoplastic, aliphatic hydrocarbon resin |
| Tacolyn ™ 4177 | Tackyfier | Eastman | An anionic, aqueous, 50% solids, solvent-free dispersion of a modified hydrocarbon resin that may be used as the sole tackifying resin with selected acrylic polymers. |
| Tacolyn ™ MBG-514 | Tackyfier | Eastman | Aqueous dispersion of resin |
| Tacolyn ™ 64 | Tackyfier | Eastman | An anionic, aqueous, 50% solids, solvent-free dispersion of a hydrogenated rosin ester. |
| Tacolyn ™ 5193 | Tackyfier | Eastman | An aqueous, 50% solids, APEO and solvent-free dispersion of a mixed feed hydrocarbon resin. |
| Aquatac ® XR 4316 | Tackyfier | Arizona | Aqueous dispersion of modified rosin |
| Alchem TMQ G2 | Antioxidant | Saficalcan | 2,2,4-Trimethyl-1,2-dihydroquinoline, polymerized |
| Aquamix ™ 126 # | Antioxidant | PolyOne | Mixture - Low staining amine AO emulsion highly effective in polychloroprene with excellent finished end product protection; 50% dispersion of Wingstay 29 |
| Bostex 379 A | Antioxidant | Akron Dispersion | Aqueous mixture of Polymerized 1,2-Dihydro-2,2,4-Trimethyl-Quinoline, Sodium Salt of Polymerized Alkylnaphthalenesulfonic Acid |
| Aquamix ™ 111 # | MBTS accelerator | PolyOne | Mixture - Benzothiazyldisulfide |
| Aquamix ™ 569# | Tackyfier | PolyOne | Mixture - Synthetic resin |
| Aquamix ™ 814 # | Tackyfier | PolyOne | Mixture - Phenolic Resin; phenolic tackifying resin with melting point at 90° C. |
| Aquamix ™ 789 # | Tackyfier | PolyOne | Hydrocarbon resin |
| Aquamix ™ 570 # | Tackyfier | PolyOne | Mixture - Terpene Phenolic Resin; terphene phenolic resin with melting point of 150° C. |
| 40% AquaRes T100H | Tackyfier | Aquaspersions | Emulsion of an aliphatic Hydrocarbon Resin |
| 60% AquaRes T20H | Tackyfier | Aquaspersions | Emulsion of a liquid Aromatic Hydrocarbon Resin |
| 50% Aquanox L | Antioxidant | Aquaspersions | Anti-degradent for use in polymer lattices |
| 45% Aquanox 2246 | Antioxidant | Aquaspersions | Antioxidant for use in polymer lattices |
| 4,4'-Methylenebis(N-phenylmaleimide) | Bismaleide | VWR | CAS# 13676-54-5 |
| Disponil ® SLS 101 Special | Emulsifier | Cognis | Emulsifier for Polymerization - Aqueous solution of: Fatty alcohol sulfate |
| Disponil ® SDS 15 | Emulsifier | Cognis | Emulsifier for Polymerization - Aqueous solution of: Sodium lauryl sulfate |
| IMCD - Sample 1 | Tackyfier | IMCD | Aqueous dispersion of stabilized rosin ester |
| Penacolite ® Resin B-16-S | Resin | Indspec | Resorcinol-Formaldehyde resin |
| Penacolite ® Resin I-168-L | Resin | Indspec | Modified diisocyanate and Resorcinol-Formaldehyde Polymer |
| Glimmer Mica TG | Filler | Quarzwerke GmbH | Natural phyllosilicates with a platelet-shaped structure |
| Glimmer Mica TF | Filler | Quarzwerke GmbH | Natural phyllosilicates with a platelet-shaped structure |
| Kaolinmehl Surmin KOG | Filler | Quarzwerke GmbH | Kaolin is a white, soft, malleable mineral comprising primarily fine-grain, platelet-shaped particles |
| G-Tec GD LCV LC | Latex | Vanderbilt Company | A natural rubber latex with approximately 60% dry rubber content in water. It contains 0.6% by weight of ammonia and small traces of HNS (Hydroxylamine Neutral Sulphate) |
| WB3 Slurry | Antioxidant | Vanderbilt Company | A 50% dispersion of VANOX MTI, 2-mercaptotolimidazole |
| PKHP-34 | Emulsifier | InChem Corporation | Dispersion of modified poly (hydroxyether) in water |

TABLE A-continued

Products Useful in Preparing the Tacky Finish

| Name | Description | Distributor/Manufacturer | Chemical Name |
|---|---|---|---|
| PKHP-35 | Emulsifier | InChem Corporation | Dispersion of modified poly (hydroxyether) in water |
| PKHP-200 | Emulsifier | InChem Corporation | Phenol, 4,4'-(1-methylethylidene)bis polymer with (chloromethyl) oxirane |
| Naugawhite ® | Antioxidant | Chemtura | 2,2'-methylenebis(6-nonyl-p-cresol) |
| Modicol 2271 | Tackyfier | Cognis | Ester gum of an aqueous emulsion |
| IntraforS 10 | Emulsifier | Cognis | Alkyl ester of sulfate |
| Litex-S 61 | Latex | Polymer Latex | Aqueous, colloidal dispersion of styrene-butadiene copolymer. |
| Penacolite Resin R - 2170 | Resin | Indspec | Aqueous solution of resorcinol-formaldehyde resin, 75% solids |
| Gentac VP 106 | Latex | Omnova | A vinyl pyridine butadiene styrene terpolymer latex. |
| Derussol AN-25-L | Carbon black dispersion | Degussa AG | Carbon black dispersion in water |

The following formulations were prepared:

RFL - 1

| Ingredient | % Solids | Dry | Wet |
|---|---|---|---|
| Water | — | — | 217.85 |
| NaOH | 50% | 1.37 | 2.73 |
| R 2170* | 75% | 20.08 | 26.77 |
| Formaldehyde* | 37% | 5.57 | 15.06 |
| VP 106* | 41% | 188.52 | 459.81 |
| Water | — | — | 103.26 |
| Derussol AN-25-L | 50% | 9.56 | 19.11 |
| Naugawhite ® | 50% | 0.98 | 1.95 |
| Tacolyn ™ 5193 | 54% | 45.33 | 83.95 |
| Water | — | — | 18.91 |
| Ammonia | 14% | 0.30 | 2.11 |
| Penacolite Resin I-168-L* | 57% | 12.00 | 21.06 |
| Total | | 283.70 | 972.57 |

*Adhesion promoter as described herein.

Reference Tacky Finish Formulations

| Ingredients | % Solids | Dry | Wet | REF 1 A | REF 1 B | REF 2 A | REF 2 B |
|---|---|---|---|---|---|---|---|
| RFL - 1 | 30% | 8.64 | 28.81 | — | 45.74 | — | 49.28 |
| Natural latex | 60% | 60.00 | 100.00 | 196.23 | 157.81 | 219.37 | 170.02 |
| Naugawhite ® | 40% | 0.75 | 1.87 | 4.33 | 2.91 | 4.84 | 3.20 |
| Modicol 2271 | 30% | 6.83 | 22.76 | 45.97 | 45.70 | — | — |
| Intrafor-S 10 | 40% | 0.27 | 0.67 | — | — | — | — |
| Litex-S 61 | 67% | 9.65 | 14.40 | 29.21 | 23.79 | 32.65 | 25.63 |
| Wingstay ® 29 | 100% | — | — | 1.39 | 1.17 | 1.54 | 1.26 |
| Wingstay ® L | 100% | — | — | 1.38 | 1.10 | 1.55 | 1.18 |

Tacky Finish (Dermulsene™) with and without RFL-1

| Ingredients | % Solids | Dry/Wet | 1 A | 1 B | 3 A* | 5 A | 5 B | 7 A | 7B | 9 A | 9 B |
|---|---|---|---|---|---|---|---|---|---|---|---|
| RFL - 1 | 30% | 8.64/28.81 | — | 22.86 | — | — | 22.88 | — | 22.89 | — | 22.88 |
| Natural latex | 60% | 60.00/100.00 | 98.15 | 78.85 | 98.25 | 98.11 | 78.94 | 98.14 | 78.98 | 98.07 | 78.95 |
| Naugawhite ® | 40% | 0.75/1.87 | 2.17 | 1.48 | 2.17 | 2.16 | 1.48 | 2.17 | 1.48 | 2.16 | 1.48 |
| Modicol 2271 | 30% | 6.83/22.76 | — | — | — | — | — | — | — | — | — |
| Intrafor-S 10 | 40% | 0.27/0.67 | — | — | — | — | — | — | — | — | — |
| Litex-S 61 | 67% | 9.65/14.40 | 14.61 | 11.89 | 14.62 | 14.60 | 11.90 | 14.61 | 11.90 | 14.60 | 11.90 |
| Dermulsene ™ 222 | 54% | — | 111.31 | 111.13 | — | — | — | — | — | — | — |
| Dermulsene ™ A 7510 | 56% | — | — | — | 107.16 | — | — | — | — | — | — |
| Dermulsene ™ HBR 803 | 53% | — | — | — | — | 114.32 | 113.32 | — | — | — | — |
| Dermulsene ™ RE 802 | 52% | — | — | — | — | — | — | 115.52 | 115.70 | — | — |
| Dermulsene ™ TR 602 | 55% | — | — | — | — | — | — | — | — | 109.62 | 109.36 |

-continued

| Ingredients | % Solids | Dry/Wet | 1 A | 1 B | 3 A* | 5 A | 5 B | 7 A | 7B | 9 A | 9 B |
|---|---|---|---|---|---|---|---|---|---|---|---|
| Wingstay ® 29 | 100% | — | 0.69 | 0.58 | 0.69 | 0.69 | 0.58 | 0.69 | 0.58 | 0.69 | 0.58 |
| Wingstay ® L | 100% | — | 0.69 | 0.55 | 0.69 | 0.69 | 0.55 | 0.69 | 0.55 | 0.69 | 0.55 |

*Mix 3A coagulated and was not usable.

Tacky Finish (Snowtack™) with and without RFL-1

| Ingredients | % Solids | Dry | Wet | 1 A | 1 B | 3 A | 3 B | 5 A | 5 B | 9 A | 9 B |
|---|---|---|---|---|---|---|---|---|---|---|---|
| RFL - 1 | 30% | 8.64 | 28.81 | — | 28.83 | — | 28.85 | — | 28.80 | — | 28.83 |
| Natural latex | 60% | 60.00 | 100.00 | 85.02 | 86.71 | 86.02 | 89.98 | 85.10 | 86.92 | 86.01 | 86.18 |
| Naugawhite | 40% | 0.75 | 1.87 | 3.13 | 3.19 | 3.17 | 3.31 | 3.13 | 3.20 | 3.17 | 3.17 |
| Modicol 2271 | 30% | 6.83 | 22.76 | — | — | — | — | — | — | — | — |
| Intrafor-S 10 | 40% | 0.27 | 0.67 | — | — | — | — | — | — | — | — |
| Litex-S 61 | 67% | 9.65 | 14.40 | 24.74 | 25.23 | 25.03 | 28.18 | 24.76 | 25.29 | 25.03 | 25.08 |
| Snowtack ™ 100 G | 55% | — | — | 108.89 | 109.01 | — | — | — | — | — | — |
| Snowtack ™ 779 F | 55% | — | — | — | — | 111.60 | 109.23 | — | — | — | — |
| Snowtack ™ SE 780 G | 55% | — | — | — | — | — | — | 107.01 | 109.30 | — | — |
| Snowtack ™ SE 780 K | 55% | — | — | — | — | — | — | — | — | 108.31 | 108.52 |
| Wingstay ® 29 | 100% | — | — | 1.27 | 1.30 | 1.29 | 1.35 | 1.28 | 1.30 | 1.29 | 1.29 |
| Wingstay ® L | 100% | — | — | 1.17 | 1.20 | 1.19 | 1.24 | 1.17 | 1.20 | 1.19 | 1.19 |

Tacky Finish (Aquatac®) with and without RFL-1

| Ingredients | % Solids | Dry | Wet | 1 A | 1 B |
|---|---|---|---|---|---|
| RFL - 1 | 30% | 8.64 | 28.81 | — | 28.90 |
| Natural latex | 60% | 60.00 | 100.00 | 93.06 | 99.27 |
| Naugawhite | 40% | 0.75 | 1.87 | 1.72 | 1.84 |
| Modicol 2271 | 30% | 6.83 | 22.76 | — | — |
| Intrafor-S 10 | 40% | 0.27 | 0.67 | — | — |
| Litex-S 61 | 67% | 9.65 | 14.40 | 13.41 | 14.30 |

-continued

| Ingredients | % Solids | Dry | Wet | 1 A | 1 B |
|---|---|---|---|---|---|
| Aquatac ® XR 4316 | 60% | — | — | 93.35 | 101.72 |
| Wingstay ® 29 | 100% | — | — | 0.79 | 0.84 |
| Wingstay ® L | 100% | — | — | 0.65 | 0.70 |

Tacky Finish (Struktol®-1) with and without RFL-1

| Ingredients | % Solids | Dry | Wet | 1 A | 1 B | 3 A | 3 B | 5 A | 5 B | 7 A | 7B |
|---|---|---|---|---|---|---|---|---|---|---|---|
| RFL - 1 | 30% | 8.64 | 28.81 | — | 28.83 | — | 28.85 | — | 28.81 | — | 28.83 |
| Natural latex | 60% | 60.00 | 100.00 | 116.04 | 117.42 | 101.78 | 98.72 | 97.82 | 99.01 | 96.80 | 98.85 |
| Naugawhite | 40% | 0.75 | 1.87 | 2.15 | 2.17 | 1.88 | 1.83 | 1.81 | 1.83 | 1.79 | 1.84 |
| Modicol 2271 | 30% | 6.83 | 22.76 | — | — | — | — | — | — | — | — |
| Intrafor-S 10 | 40% | 0.27 | 0.67 | — | — | — | — | — | — | — | — |
| Litex-S 61 | 67% | 9.65 | 14.40 | 16.72 | 16.92 | 14.66 | 14.22 | 14.09 | 14.26 | 13.95 | 14.33 |
| Struktol ® LT 159 | 40% | — | — | 126.83 | 128.33 | — | — | — | — | — | — |
| Struktol ® LT 356 | 51% | — | — | — | — | 120.61 | 116.98 | — | — | — | — |
| Struktol ® XP 4392 | 50% | — | — | — | — | — | — | 119.72 | 121.17 | — | — |
| Struktol ® XP 4394 | 50% | — | — | — | — | — | — | — | — | 117.44 | 120.66 |
| Struktol ® XP 4395 | 50% | — | — | — | — | — | — | — | — | — | — |
| Struktol ® XP 4397 | 50% | — | — | — | — | — | — | — | — | — | — |
| Struktol ® XP 4398 | 52% | — | — | — | — | — | — | — | — | — | — |
| Wingstay ® 29 | 100% | — | — | 0.98 | 0.99 | 0.86 | 0.83 | 0.83 | 0.84 | 0.82 | 0.84 |
| Wingstay ® L | 100% | — | — | 0.82 | 0.83 | 0.72 | 0.69 | 0.69 | 0.70 | 0.68 | 0.70 |

Tacky Finish (Struktol®-1) with and without RFL-1 (Cont.)

| Ingredients | 9 A | 9 B | 11 A | 11 B | 13 A | 13 B |
|---|---|---|---|---|---|---|
| RFL - 1 | — | 28.90 | — | 18.83 | — | 28.81 |
| Natural latex | 98.08 | 98.83 | 96.16 | 98.73 | 95.06 | 100.73 |
| Naugawhite | 1.81 | 1.83 | 1.78 | 1.83 | 1.76 | 1.86 |
| Modicol 2271 | — | — | — | — | — | — |
| Intrafor-S 10 | | | | | | |
| Litex-S 61 | 14.13 | 14.24 | 13.85 | 14.22 | 13.70 | 14.51 |
| Struktol ® LT 159 | — | — | — | — | — | — |
| Struktol ® LT 356 | — | — | — | — | — | — |
| Struktol ® XP 4392 | — | — | — | — | — | — |
| Struktol ® XP 4394 | — | — | — | — | — | — |
| Struktol ® XP 4395 | 119.70 | 120.62 | — | — | — | — |
| Struktol ® XP 4397 | — | — | 117.75 | 120.90 | — | — |
| Struktol ® XP 4398 | — | — | — | — | 112.42 | 119.13 |
| Wingstay ® 29 | 0.83 | 0.83 | 0.81 | 0.83 | 0.80 | 0.85 |
| Wingstay ® L | 0.69 | 0.70 | 0.68 | 0.69 | 0.67 | 0.71 |

Tacky Finish (Struktol®-2) with and without RFL-1

| Ingredients | % Solids | Dry | Wet | 1 A | 1 B | 1 C | 2 A | 2 B | 2 C | 3 A | 3 B | 3 C |
|---|---|---|---|---|---|---|---|---|---|---|---|---|
| RFL - 1 | 30% | 8.64 | 28.81 | — | 28.88 | 14.42 | — | 28.83 | 14.43 | — | 28.83 | 14.44 |
| Natural latex | 60% | 60.00 | 100.00 | 96.81 | 100.02 | 100.53 | 95.61 | 101.57 | 100.68 | 97.71 | 100.00 | 99.95 |
| Naugawhite | 40% | 0.75 | 1.87 | 1.87 | 1.93 | 1.94 | 1.84 | 1.96 | 1.94 | 1.88 | 1.93 | 1.93 |
| Modicol 2271 | 30% | 6.83 | 22.76 | — | — | — | — | — | — | — | — | — |
| Intrafor-S 10 | 40% | 0.27 | 0.67 | — | — | — | — | — | — | — | — | — |
| Litex-S 61 | 67% | 9.65 | 14.40 | 13.90 | 14.26 | 14.44 | 13.73 | 14.58 | 14.46 | 14.03 | 14.36 | 14.35 |
| Struktol ® LT 356 | 51% | — | — | 22.70 | 23.45 | 23.57 | 44.79 | 47.58 | 47.17 | 68.60 | 70.21 | 70.18 |
| Struktol ® χP 4395 | 50% | — | — | — | — | — | — | — | — | — | — | — |
| Wingstay ® 29 | 100% | — | — | 0.68 | 0.70 | 0.70 | 0.67 | 0.71 | 0.70 | 0.68 | 0.70 | 0.70 |
| Wingstay ® L | 100% | — | — | 0.72 | 0.74 | 0.74 | 0.71 | 0.75 | 0.75 | 0.72 | 0.74 | 0.74 |

Tacky Finish (Struktol®-2) with and without RFL-1 (Cont.)

| Ingredients | 4 A | 4 B | 4 C | 5 A | 5 B | 5 C | 6 A | 6 B | 6 C |
|---|---|---|---|---|---|---|---|---|---|
| RFL - 1 | — | 28.85 | 14.46 | — | 28.83 | 14.43 | — | 28.89 | 14.46 |
| Natural latex | 95.16 | 100.00 | 101.23 | 96.83 | 100.40 | 100.96 | 98.25 | 99.99 | 100.07 |
| Naugawhite ® | 1.84 | 1.93 | 1.95 | 1.87 | 1.94 | 1.95 | 1.89 | 1.93 | 1.93 |
| Modicol 2271 | — | — | — | — | — | — | — | — | — |
| Intrafor-S 10 | — | — | — | — | — | — | — | — | — |
| Litex-S 61 | 13.66 | 14.36 | 14.54 | 13.90 | 14.42 | 14.50 | 14.11 | 14.36 | 14.37 |
| Struktol ®LT 356 | — | — | — | — | — | — | — | — | — |
| Struktol ®XP 4395 | 22.94 | 24.10 | 24.40 | 46.68 | 48.40 | 48.67 | 71.08 | 72.34 | 72.39 |
| Wingstay ®29 | 0.67 | 0.70 | 0.71 | 0.68 | 0.70 | 0.71 | 0.69 | 0.70 | 0.70 |
| Wingstay ®L | 0.71 | 0.74 | 0.75 | 0.72 | 0.74 | 0.75 | 0.73 | 0.74 | 0.74 |

Tacky Finish (Struktol®-3) with and without RFL-1

| Ingredients | % Solids | Dry | Wet | 3 D | 5 D | 7 D | 9 B | 9 B + TMQ | 9 D | 15 A | 15 B |
|---|---|---|---|---|---|---|---|---|---|---|---|
| RFL - 1 | 30% | 8.64 | 28.81 | 20.30 | 21.84 | 20.69 | 20.42 | 20.42 | 20.24 | — | 20.22 |
| Natural latex | 60% | 60.00 | 100.00 | 70.02 | 70.02 | 70.01 | 70.28 | 70.30 | 70.04 | 70.18 | 70.21 |
| Naugawhite ® | 40% | 0.75 | 1.87 | 1.36 | 1.39 | 1.34 | 1.37 | 1.37 | 1.42 | 1.34 | 1.35 |
| Modicol 2271 | 30% | 6.83 | 22.76 | — | — | — | — | — | — | — | — |
| Intrafor-S 10 | 40% | 0.27 | 0.67 | — | — | — | — | — | — | — | — |
| Litex-S 61 | 67% | 9.65 | 14.40 | 10.16 | 11.03 | 10.26 | 10.22 | 10.22 | 10.61 | 10.11 | 10.11 |
| Struktol ®LT 356 | 51.3% | — | — | 81.87 | — | — | — | — | — | — | — |
| Struktol ®XP 4392 | 49.6% | — | — | — | 84.63 | — | — | — | — | — | — |
| Struktol ®XP 4394 | 50.1% | — | — | — | — | 83.87 | — | — | — | — | — |
| Struktol ®XP 4395 | 49.8% | — | — | — | — | — | 85.64 | 85.67 | 86.16 | — | — |
| Struktol ®XP 4399 | 51.3% | — | — | — | — | — | — | — | — | 81.99 | 82.01 |
| Aquamix ™ 126 # | 55% | — | — | 1.29 | 1.01 | 0.82 | — | — | 0.77 | — | — |
| Bostex 379 A | 54% | — | — | 1.25 | 1.22 | 0.77 | — | — | 0.90 | — | — |
| Alchem TMQ G2 | 25% | — | — | — | — | — | — | 4.00 | — | — | — |
| Wingstay ® 29 | 100% | — | — | — | — | — | 1.67 | 1.68 | — | 0.72 | 0.72 |
| Wingstay ®L | 100% | — | — | 0.49 | 0.99 | 0.50 | 0.55 | 0.55 | 0.56 | 0.49 | 0.49 |

Tacky Finish (Struktol®-4) with RFL-1

| Ingredients | % Solids | Dry | Wet | 9 B | 9 B a | 9 B b | 9 B c | 9 B d | 9 B e | 9 B f | 9 B g |
|---|---|---|---|---|---|---|---|---|---|---|---|
| RFL - 1 | 30% | 8.64 | 28.81 | 30.02 | 28.84 | 28.84 | 28.84 | 28.84 | 28.84 | 28.84 | 29.57 |
| Natural latex | 60% | 60.00 | 100.00 | 103.18 | 99.15 | 99.14 | 99.14 | 99.13 | 99.13 | 99.14 | 99.19 |
| Naugawhite ® | 40% | 0.75 | 1.87 | 2.02 | 1.94 | 1.94 | 1.94 | 1.94 | 1.94 | 1.94 | 1.94 |
| Modicol 2271 | 30% | 6.83 | 22.76 | — | — | — | — | — | — | — | — |
| Intrafor-S 10 | 40% | 0.27 | 0.67 | — | — | — | — | — | — | — | — |
| Litex-S 61 | 67% | 9.65 | 14.40 | 15.65 | 15.04 | 15.04 | 15.04 | 15.04 | 15.04 | 15.04 | 15.05 |
| Struktol ® XP 4395 | 49.8% | — | — | 125.40 | 120.50 | 120.50 | 120.50 | 120.49 | 120.48 | 120.50 | 62.75 |
| Struktol ® XP 4399 | 51.3% | — | — | — | — | — | — | — | — | — | 60.12 |
| Struktol ® XP 4400 | 50.3% | — | — | — | — | 0.76 | 0.76 | — | — | — | — |
| Struktol ® XP 4402 | | | | | | | | | | | |
| Aquamix ™ 111 # | 54.9% | — | — | — | — | — | — | 0.55 | — | 0.58 | — |
| Water | — | — | — | — | — | — | — | 12.04 | — | 12.04 | 12.07 |
| Ammonia | 14% | — | — | — | — | — | — | 1.86 | — | 1.86 | 1.87 |
| Penacolite Resin I-168-L | 57% | — | — | — | — | — | — | 13.13 | — | 13.12 | 13.16 |
| 4,4' Methylenebis (N-phenyl maleimide) | 95% | — | — | — | — | — | — | — | 0.32 | 0.31 | — |
| Wingstay ® 29 | 100% | — | — | 0.86 | 0.82 | 0.82 | 0.82 | 0.82 | 0.82 | 0.82 | 0.82 |
| Wingstay ®L | 100% | — | — | 0.72 | 0.70 | 0.70 | 0.70 | 0.70 | 0.70 | 0.70 | 0.70 |

Tacky Finish (Aquamix™) with and without RFL-1

| Ingredients | % Solids | Dry | Wet | 1 A | 1 B | 3 A* | 5 A | 5 B | 7 A | 7 B |
|---|---|---|---|---|---|---|---|---|---|---|
| RFL - 1 | 30% | 8.64 | 28.81 | — | 28.85 | — | — | 28.90 | — | 28.87 |
| Natural latex | 60% | 60.00 | 100.00 | 97.32 | 99.72 | 198.79 | 96.89 | 99.91 | 97.88 | 99.81 |
| Naugawhite ® | 40% | 0.75 | 1.87 | 1.92 | 1.97 | 3.93 | 1.91 | 1.97 | 1.93 | 1.97 |
| Modicol 2271 | 30% | 6.83 | 22.76 | — | — | — | — | — | — | — |
| Intrafor-S 10 | 40% | 0.27 | 0.67 | — | — | — | — | — | — | — |
| Litex-S 61 | 67% | 9.65 | 14.40 | 14.62 | 14.98 | 29.87 | 14.56 | 15.01 | 14.71 | 15.00 |
| Aquamix ™ 814 # | 62% | — | — | 93.40 | 95.71 | — | — | — | — | — |
| Aquamix ™ 789 # | 52% | — | — | — | — | 230.87 | — | — | — | — |

-continued

| Ingredients | % Solids | Dry | Wet | 1 A | 1 B | 3 A* | 5 A | 5 B | 7 A | 7 B |
|---|---|---|---|---|---|---|---|---|---|---|
| Aquamix ™ 570 # | 53% | — | — | — | — | — | 109.56 | 113.08 | — | — |
| Aquamix ™ 569# | 52% | — | — | — | — | — | — | — | 113.04 | 115.27 |
| Aquamix ™ 126 # | 55% | — | — | — | — | — | — | — | — | — |
| Bostex 379 A | 54% | — | — | — | — | — | — | — | — | — |
| Aquamix ™ 111 # | 52% | — | — | — | — | — | — | — | — | — |
| Wingstay ®29 | 100% | — | — | 0.68 | 0.70 | 1.40 | 0.68 | 0.70 | 0.69 | 0.70 |
| Wingstay ®L | 100% | — | — | 0.68 | 0.70 | 1.39 | 0.68 | 0.70 | 0.69 | 0.70 |

*Mix 3A coagulated and was not usable.

Tacky Finish (Matrix-9) with RFL-1

| Ingredients | % Solids | Dry | Wet | 9B | 4 | 5 | 6 | 7 | 8 | 15 | 16 |
|---|---|---|---|---|---|---|---|---|---|---|---|
| RFL - 1 | 30% | 8.64 | 28.81 | 29.17 | 29.24 | 29.21 | 29.24 | 29.23 | 29.24 | 29.24 | 29.24 |
| Natural latex | 60% | 60.00 | 100.00 | 100.40 | 100.61 | 100.54 | 100.63 | 100.60 | 100.62 | 100.62 | 100.64 |
| Naugawhite ® | 40% | 0.75 | 1.87 | 2.01 | 2.02 | 2.02 | 2.02 | 2.02 | 2.02 | 2.02 | 2.02 |
| Modicol 2271 | 30% | 6.83 | 22.76 | — | — | — | — | — | — | — | — |
| Intrafor-S 10 | 40% | 0.27 | 0.67 | — | — | — | — | — | — | — | — |
| Litex-S 61 | 67% | 9.65 | 14.40 | 14.01 | 14.04 | 14.03 | 14.04 | 14.04 | 14.04 | 14.04 | 14.04 |
| Struktol ®XP 4395 | 49.8% | — | — | 119.35 | 119.60 | 119.52 | 119.63 | 119.58 | 119.61 | 119.61 | 119.63 |
| Struktol ®LA 214 | 56% | — | — | — | 0.71 | — | — | — | — | — | — |
| Struktol ®LA 229 | 40% | — | — | — | — | 0.79 | — | — | — | — | — |
| Struktol ®LA 331 | 50% | — | — | — | — | — | 0.77 | — | — | — | — |
| 50% Aquanox L | 52% | — | — | — | — | — | — | 0.79 | — | — | — |
| 45% Aquanox 2246 | 46% | — | — | — | — | — | — | — | 0.76 | — | — |
| Disponil SLS 101 Special | 31% | — | — | — | — | — | — | — | — | 0.68 | — |
| Disponil SDS 15 | 12% | — | — | — | — | — | — | — | — | — | 0.68 |
| Wingstay 29 | 100% | — | — | 0.75 | 0.75 | 0.75 | 0.75 | 0.75 | 0.75 | 0.75 | 0.75 |
| Wingstay L | 100% | — | — | 0.73 | 0.73 | 0.73 | 0.73 | 0.73 | 0.73 | 0.73 | 0.73 |

Tacky Finish (Matrix-9) with RFL-1 (Cont.)

| Ingredients | % Solids | Dry | Wet | 9B | A | B | C* | D* | F |
|---|---|---|---|---|---|---|---|---|---|
| RFL - 1 | 30% | 8.64 | 28.81 | 28.68 | 28.66 | 28.68 | 28.66 | 19.02 | 28.67 |
| Natural latex | 60% | 60.00 | 100.00 | 99.77 | 99.72 | 99.77 | 99.72 | 66.17 | 99.75 |
| Naugawhite ® | 40% | 0.75 | 1.87 | 1.90 | 1.90 | 1.90 | 1.90 | 1.26 | 1.90 |
| Modicol 2271 | 30% | 6.83 | 22.76 | — | — | — | — | — | — |
| Intrafor-S 10 | 40% | 0.27 | 0.67 | — | — | — | — | — | — |
| Litex-S 61 | 67% | 9.65 | 14.40 | 14.47 | 14.46 | 14.47 | 14.46 | 9.60 | 14.47 |
| Struktol ® XP 4395 | 49.8% | — | — | 120.79 | — | — | — | 74.85 | — |
| 40% Aquares T 100 H | 42.4% | — | — | — | 141.48 | — | — | — | — |
| 60% Aquares T 20 H | 65.8% | — | — | — | — | 94.66 | — | — | — |
| IMCD - Sample 1 | 51% | — | — | — | — | — | 127.87 | 9.45 | 117.71 |
| Penacolite Resin B-16-S | 50% | — | — | — | — | — | — | — | — |
| Syvatac RE 85 | 100% | — | — | — | — | — | — | — | — |
| Hydro-Rez ™ 1100 D | 33% | — | — | — | — | — | — | — | — |
| Hydro-Rez ™ 1400 D | 30% | — | — | — | — | — | — | — | — |
| Hydro-Rez ™ 800 E | 44% | — | — | — | — | — | — | — | — |
| Pliocord ®SB 2108 | 41% | — | — | — | — | — | — | — | — |
| Pliotec ®EL 80 | 55% | — | — | — | — | — | — | — | — |
| Pliotec ®EL 25 | 50% | — | — | — | — | — | — | — | — |
| Wingstay ®29 | 100% | — | — | 0.77 | 0.77 | 0.77 | 0.77 | 0.51 | 0.77 |
| Wingstay ®L | 100% | — | — | 0.70 | 0.70 | 0.70 | 0.70 | 0.46 | 0.70 |

*Mix C and Mix D coagulated and were not usable.

Tacky Finish (Matrix-9) with RFL-1 (Cont.)

| Ingredients | 9 | 10 | 11 | 12 | 13 | 14 |
|---|---|---|---|---|---|---|
| RFL - 1 | 28.77 | 28.76 | 28.99 | 29.25 | 28.94 | 28.78 |
| Natural latex | 99.86 | 99.84 | 100.64 | 101.53 | 100.47 | 99.91 |
| Naugawhite ® | 2.22 | 2.22 | 2.24 | 2.26 | 2.24 | 2.22 |
| Modicol 2271 | — | — | — | — | — | — |

-continued

| Ingredients | 9 | 10 | 11 | 12 | 13 | 14 |
|---|---|---|---|---|---|---|
| Intrafor-S 10 | — | — | — | — | — | — |
| Litex-S 61 | — | — | — | — | — | — |
| Struktol ® XP 4395 | 120.56 | 120.53 | 121.50 | 122.57 | 121.29 | 120.61 |
| 40% Aquares T 100 H | — | — | — | — | — | — |
| 60% Aquares T 20 H | — | — | — | — | — | — |
| IMCD - Sample 1 | — | — | — | — | — | — |
| Penacolite Resin B-16-S | — | — | — | — | — | — |
| Syvatac RE 85 | — | — | — | — | — | — |
| Hydro-Rez ™ 1100 D | 14.20 | — | — | — | — | — |
| Hydro-Rez ™ 1400 D | — | 14.21 | — | — | — | — |
| Hydro-Rez ™ 800 E | — | — | 14.17 | — | — | — |
| Pliocord ®SB 2108 | — | — | — | 14.16 | — | — |
| Pliotec ®EL 80 | — | — | — | — | 14.20 | — |
| Pliotec ®EL 25 | — | — | — | — | — | 14.20 |
| Wingstay ®29 | 0.78 | 0.78 | 0.79 | 0.79 | 0.79 | 0.78 |
| Wingstay ®L | 0.71 | 0.71 | 0.71 | 0.72 | 0.71 | 0.71 |

Tacky Finish (Matrix-10) with RFL-1

| Ingredients | % Solids | Dry | Wet | RFL-2 | A | B | C | D | E |
|---|---|---|---|---|---|---|---|---|---|
| Struktol ®XP 4395 | 49.8% | 22.39 | 44.96 | 354.60 | — | — | — | — | — |
| Natural latex | 60% | 22.39 | 37.32 | 427.56 | 93.40 | 93.62 | 93.53 | 93.53 | 93.65 |
| RFL - 1 | 30% | 3.23 | 10.75 | 102.11 | 26.84 | 26.93 | 26.94 | 27.04 | 27.26 |
| Naugawhite ® | 40% | 0.28 | 0.70 | 6.67 | 1.86 | 1.77 | 1.85 | 1.88 | 1.89 |
| Litex-S 61 | 67% | 3.60 | 5.37 | 51.27 | 13.70 | 13.77 | 14.02 | 14.64 | 14.45 |
| Wingstay ®29 | 100% | 0.26 | 0.26 | 2.81 | 0.73 | 0.65 | 0.92 | 0.66 | 0.72 |
| Wingstay ®L | 40% | 0.26 | 0.65 | 6.42 | 1.63 | 6.79 | 1.68 | 2.12 | 1.68 |
| Struktol ®XP 4395 - A | 49.8% | — | — | — | 112.50 | — | — | — | — |
| Struktol ®XP 4395 - B | 50.0% | — | — | — | — | 112.54 | — | — | — |
| Struktol ®XP 4406 | 47.8% | — | — | — | — | — | 112.43 | — | — |
| Struktol ®XP 4407 | 50.9% | — | — | — | — | — | — | 112.52 | — |
| Struktol ®XP 4408 | 49.5% | — | — | — | — | — | — | — | 113.30 |
| Struktol ®XP 4409 | 47.9% | — | — | — | — | — | — | — | — |
| Struktol ®XP 4410 | 47.6% | — | — | — | — | — | — | — | — |
| G-Tec GD LCVLC | 60.8% | — | — | — | — | — | — | — | — |
| WB3 Slurry | 50.8% | — | — | — | — | — | — | — | — |
| Glimmer Mica TG | 100% | — | — | — | — | — | — | — | — |
| Glimmer Mica TF | 100% | — | — | — | — | — | — | — | — |
| Kaolinmehl Surmin KOG | 100% | — | — | — | — | — | — | — | — |

Tacky Finish (Matrix-10) with RFL-1 (Cont.)

| Ingredients | F | G | H | I | J | K | L |
|---|---|---|---|---|---|---|---|
| Struktol ®XP 4395 | — | — | 114.25 | 93.48 | 74.70 | 74.57 | 74.59 |
| Natural latex | 93.67 | 93.70 | — | 112.72 | 90.07 | 89.92 | 89.94 |
| RFL - 1 | 27.06 | 27.13 | 27.15 | 26.92 | 21.51 | 21.47 | 21.48 |
| Naugawhite ® | 1.90 | 1.83 | 1.86 | 1.76 | 1.41 | 1.40 | 1.40 |
| Litex-S 61 | 13.82 | 13.88 | 13.57 | 13.52 | 10.80 | 10.78 | 10.78 |
| Wingstay ®29 | 0.82 | 0.86 | 0.73 | 0.74 | 0.59 | 0.59 | 0.59 |
| Wingstay ®L | 1.94 | 2.01 | 1.87 | 1.69 | 1.35 | 1.35 | 1.35 |
| Struktol ®XP 4395 - A | — | — | — | — | — | — | — |
| Struktol ®XP 4395 - B | — | — | — | — | — | — | — |
| Struktol ®XP 4406 | — | — | — | — | — | — | — |
| Struktol ®XP 4407 | — | — | — | — | — | — | — |
| Struktol ®XP 4408 | — | — | — | — | — | — | — |
| Struktol ®XP 4409 | 112.46 | — | — | — | — | — | — |
| Struktol ®XP 4410 | — | 112.80 | — | — | — | — | — |
| G-Tec GD LCVLC | — | — | 93.31 | — | — | — | — |
| WB3 Slurry | — | — | — | 0.68 | — | — | — |
| Glimmer Mica TG | — | — | — | — | 20.02 | — | — |
| Glimmer Mica TF | — | — | — | — | — | 20.09 | — |
| Kaolinmehl Surmin KOG | — | — | — | — | — | — | 20.00 |

In the following examples, both RFL and tacky finish formulations were applied to the fabric using a conventional padding treatment procedure. In the RFL treatment procedure, the fabric was padded with the RFL formulation and dried for 45 seconds at 140° C. in a convection oven. The fabric was then cured for 45 seconds at 190° C. in the same convection oven. After the RFL treatment, the fabric was then further padded with the tacky finish formulation and dried for 45 seconds in a 130° C. convection oven.

"Tire Rubber 1," "Tire Rubber 2," and "Tire Rubber 3" were standard, commercially available tire rubber samples.

C. Tacky Level Fabric-to-Fabric (F/F) Test Procedure

The following test procedure was used to evaluate the tack level of the treated fabric:

Equipment Set-Up

In this test procedure, two pieces of treated fabric are pressed against each other and then torn away from each other. The compression force was constant at 200 N. The amount of force that is needed to tear the two pieces of fabric away from each other is calculated as the amount of tackiness and is provided in the test results as such. The equipment used for this test was a Lloyd instruments LRX with a load cell of 500 Newtons. The test surface was 5 centimeters by 5 centimeters in size.

Preparation of the test equipment included turning on the Lloyd instrument, the PC and the display monitor. After the PC started up, the program was initiated by double clicking on the "Go" icon. Remote control (A of B) on pressed on the console. On the display monitor, the red space bar was moved to the $3^{rd}$ line to indicate "load test set-up," the "enter" button was pressed. In the space provided, "TACK" was typed and the "enter" button was pressed. The red space bar was moved to the 4th line to indicate "perform test" and the "enter" button was pressed two times. The test layout appeared.

Fabric Testing

Three test strips were cut from the fabric with measurements +/−8 cm in the fill direction and +/−20 cm in warp direction. The three test strips were cut from the left side of the fabric, from the middle of the fabric and from the right side of the fabric. The fabric strips were cut in the middle for the bottom clamp and the upper clamp.

The fabric strips were positioned into the clamped and secured in place. The distance between the 2 clamps was 108 mm. The test was started by pressing F6=0 and then F7=start.

After the 4 following steps the upper clamp comes down:

| | |
|---|---|
| Step 1 | 300 mm/min. |
| Step 2 | 50 mm/min. |
| Step 3 | 10 mm/min. |
| Step 4 | 10 mm/min. |

At step 4, the upper clamp presses on the bottom clamp for 60 seconds at 200 Newtons of pressure. The various steps were observable on the monitor. At the end of the test, the upper clamp comes up in step 5 with a speed of 10 mm/minute and 300 mm/minute. The test results were displayed on the monitor and were provided as Newtons.

D. Tacky Level Fabric-to-Rubber (F/R) Test Procedure

The following test procedure was used to evaluate the tack level of the treated fabric and rubber:

A strip of the treated fabric was cut into 5 cm×25 cm sample size. The fabric was placed on top of a rubber sample to form a fabric-rubber composite. A 9 kg weight was applied to the fabric-rubber composite for a certain period of time (approximately 30 seconds). The weight was removed after expiration of the time period. The tacky level of the fabric to rubber (e.g. the force required to pull the fabric from the rubber sample) was determined using a tensile tester machine to pull apart the fabric from the rubber sample. The results were provided in Newtons/5 cm.

E. Adhesion Test Procedure

A modified version of ASTM D4393 "Standard Test Method for Strap Peel Adhesion of Reinforcing Cords or Fabrics to Rubber Compounds" was used to determine adhesion of treated fabric to rubber.

Multiple layers of the treated fabric and rubber samples were combined as illustrated below:

| Belt Compound | |
|---|---|
| -------------------------- | Mica |
| XXXXXXXXXXXXX | Belt compound (1.02 mm) |
| =============== | Treated Fabric |
| XXXXXXXXXXXXX | Belt compound (1.02 mm) |
| =============== | Treated Fabric |
| ---- | Mica |
| XXXXXXXXXXXXX | Belt compound (1.02 mm) |
| =============== | Treated Fabric |
| XXXXXXXXXXXXX | Belt compound (1.02 mm) |
| =============== | Treated Fabric |
| XXXXXXXXXXXXX | Belt compound (1.02 mm) |
| -------------------------- | Mica |
| Base Tread Compound | |
| -------------------------- | Mica |
| =============== | Treated Fabric |
| XXXXXXXXXXXXX | Base tread compound (3.53 mm) |
| ---- | Mica |
| =============== | Treated Fabric |
| XXXXXXXXXXXXX | Base tread compound (3.53 mm) |
| -------------------------- | Mica |

Vulcanization conditions for treated fabric combined with Tire Rubber 2 samples were 32 minutes at 160° C. at 26.0 bar pressure. Vulcanization conditions for treated fabric combined with Tire Rubber 3 samples were 24 minutes at 170° C. at 26.0 bar pressure. Test results were provided in Newtons/mm.

F. Tensile Strength and Elongation Test Procedure

A modified version of standard test method DIN 53857 was used to evaluate the tensile strength (or breaking load) and elongation (or extension at break) of the treated fabric. The breaking load was the maximum load applied to a specimen in stretching it to rupture. The breaking extension was the extension at breaking load. The extension at a specified loading was generally specified as % of the ultimate tensile strength.

The test procedure was as follows:

The equipment used for this test was a Lloyd 50 KN tensile tester with rubber-lined jaw faces that were 10 centimeters wide and having a load cell of 30 KN.

In preparing the fabric samples for testing, 150 mm of the selvedge was avoided and, where possible, no two fabric samples contained the same ends. Three fabric samples were cut (or five fabric samples for fabric wider than 160 centimeters) in both the warp and fill direction. Each sample measured 60 mm wide and 500 mm long (for knitted elastic fabrics, the samples were cut 50 mm wide and 500 mm long). Care was taken to not allow the fabric to fray during the step of cutting.

The direction of warp threads for each fabric samples was marked.

The fabric samples were then frayed down to 50 mm in width by removing the threads equally on either side of the samples. Care was taken to ensure that each fabric sample contained the same number of warp and fill yarns.

Testing of standard fabric with feelers included setting the crosshead speed to 300 m/min, setting the gauge length to 200 mm, setting the laser electronics length to 100 mm, and using 180 bar pressure for the jaws.

The fabric sample was inserted into the upper and lower grips ensuring that the specimen is straight.

Pretension was set at: EP 63: 90N
(1/10 of min. Tensile/cm required) EP 80: 110 N
   EP 100: 135 N
   EP 125: 170 N
   EP 160: 210 N
   EP 200: 260 N
   EP 250: 315 N
   EP 350: 415 N
   EP 400: 580 N Testing of standard fabric without feelers included setting the crosshead speed to 200 m/min, setting the gauge length to 200 mm, no laser scan was utilized, and using 180 bar pressure for the jaws.

The fabric sample was inserted into the upper and lower grips ensuring that the specimen is straight. Pretension was set at 40 N.

Testing of elastic knitted fabric without feelers included setting the crosshead speed to 100 m/min, setting the gauge length to 100 mm, no laser scan was utilized, and using 180 bar pressure for the jaws.

The maximum breaking load for the warp and for the fill fabric samples was determined from the test procedure. The mean values for the warp and fill samples were calculated separately using the following equation:

$$\% \text{ extension} = \frac{L(\text{mm})}{\text{gauge length}(\text{mm})(1)} \times 100$$

$L$: elongation in mm (1): gauge length by using laser electronics = 100 mm without laser electronics = 200 mm elastic knitted fabric = 100 mm All results were calculated through a computer which was connected to the testing machines.

It was noted that if the break of any test fabric occurred within 5 mm of the jaw at the load substantially less than the average of normal breaks, this activity would be recorded. However, the test result would be rejected for breaking load and extension.

G. Acing Test Procedure

Samples put in an oven at 70° C. for a total period of 240 hours. The fabric-to-fabric tacky level) (K/I/0°) was tested at 0, 24, 48, 72, 96, 168 and 240 hours.

H. Test Results

Several fabrics were treated with various tacky finishes of the present invention (with and without RFL treatment). These treated fabrics were tested for tackiness and for tensile strength and elongation according to the test procedures described herein.

"DPU" is dry pick up; I=Weft side; K=Warp side; 0°=chains tested in the same direction; 90°=chains tested crossed; F/F=Tacky level tested fabric-to-fabric; F/TR1=Tacky level tested fabric-to-Tire Rubber 1; I/TR1=Tacky level tested Weft side-to-Tire Rubber 1; K/TR1=Tacky level tested Warp side-to-Tire Rubber 1; Belt=Adhesion results to the Belt compound for the tire rubber sample; Under tread=Adhesion results to the Under tread compound of the tire rubber sample.

Test results are provided in Tables 1A to 10 below.

TABLE 1A

Tackiness Test Results for Dermulsene ™ Product Without RFL

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Production REF | Fabric A | 235.19 | 17.90 | 7.61 | 8.2187 | 8.8737 | 6.7889 | 5.5824 |
| Mix With Modicol | Fabric A | 255.58 | 38.29 | 14.98 | 23.1370 | 13.1360 | 15.2900 | 16.2940 |
| Mix With Modicol | Fabric B | 195.20 | 33.83 | 17.33 | 5.9624 | 2.7116 | 4.0883 | 7.0928 |
| Mix Without Modicol | Fabric A | 260.06 | 42.77 | 16.45 | 16.6280 | 8.8056 | 10.2560 | 12.0160 |
| Mix Without Modicol | Fabric B | 198.05 | 36.68 | 18.52 | 4.9759 | 3.2948 | 4.0952 | 3.7473 |
| Dermulsene ™ 222 (1A) | Fabric A | 257.20 | 39.91 | 15.52 | 16.2650 | 11.8860 | 11.6470 | 13.4520 |
| Dermulsene ™ HBR 803 (5A) | Fabric A | 251.09 | 33.80 | 13.46 | 24.3710 | 13.4760 | 15.9670 | 15.2000 |
| Dermulsene ™ RE 802 (7A) | Fabric A | 249.04 | 31.75 | 12.75 | 22.3060 | 19.4450 | 14.6170 | 15.0800 |
| Dermulsene ™ TR 602 (9A) | Fabric A | 249.33 | 32.04 | 12.85 | 21.0590 | 12.2270 | 17.0070 | 18.8610 |

TABLE 1B

Tackiness Test Results for Dermulsene ™ Product With RFL

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Production REF | Fabric A | 235.19 | 17.90 | 7.61 | 8.2187 | 8.8737 | 6.7889 | 5.5824 |
| Mix With Modicol | Fabric A | 247.39 | 30.10 | 12.17 | 13.2470 | 10.6690 | 10.0680 | 10.8160 |
| Mix With Modicol | Fabric B | 204.54 | 43.17 | 21.11 | 4.6588 | 5.7341 | 4.7128 | 3.7185 |
| Mix Without Modicol | Fabric A | 237.84 | 20.55 | 8.64 | 6.2958 | 11.2400 | 9.2775 | 9.8329 |
| Mix Without Modicol | Fabric B | 187.82 | 26.45 | 14.08 | 4.0540 | 3.0475 | 3.2835 | 3.9054 |
| Dermulsene ™ 222 (1B) | Fabric A | 244.26 | 26.97 | 11.04 | 10.0880 | 5.5191 | 5.6581 | 3.7806 |
| Dermulsene ™ HBR 803 (5B) | Fabric B | 181.37 | 20.00 | 11.03 | 2.0557 | 1.1296 | 1.2301 | 0.7410 |
| Dermulsene ™ RE 802 (7B) | Fabric B | 176.56 | 15.19 | 8.60 | 1.5739 | 1.3568 | 1.4478 | 1.6406 |
| Dermulsene ™ TR 602 (9B) | Fabric B | 177.12 | 15.75 | 8.89 | 1.8242 | 1.5132 | 1.8294 | 1.8189 |

TABLE 1C

Aging Test Results for Dermulsene ™ Product Without RFL

| Sample | Fabric | Tacky Level (F/F) (Newtons) At Time Intervals 0 | 24 | 48 | 72 | 120 | 168 | 240 | 288 |
|---|---|---|---|---|---|---|---|---|---|
| REF 1 A | Fabric A | 16.2940 | 12.9080 | — | 9.9425 | — | 11.2240 | 5.7529 | — |
| REF 1 A | Fabric B | 7.0928 | 5.1722 | — | 3.6980 | — | 1.5491 | 1.3177 | — |
| REF 2 A | Fabric A | 12.0160 | 9.7626 | — | 10.5560 | — | 3.8279 | 3.9306 | — |
| REF 2 A | Fabric B | 3.7473 | 3.9516 | — | 3.4607 | — | 0.7477 | 1.5362 | — |
| Dermulsene ™ 1A | Fabric A | 13.4520 | 7.0224 | — | 5.7032 | — | 0.2339 | 0.0737 | — |
| Dermulsene ™ 7A | Fabric A | 15.0800 | 10.9020 | — | 6.6818 | — | 6.0924 | 3.1702 | — |
| Dermulsene ™ 9A | Fabric A | 18.8610 | 5.5961 | 8.2773 | — | 5.2358 | 4.4542 | — | 7.7967 |

TABLE 1D

Aging Test Results for Dermulsene ™ Product With RFL

| Sample | Fabric | Tacky Level (F/F) (Newtons) At Time Intervals 0 | 24 | 48 | 72 | 120 | 168 | 240 | 288 |
|---|---|---|---|---|---|---|---|---|---|
| REF 1 B | Fabric A | 10.8160 | 7.5774 | — | 4.8813 | — | 0.3320 | 0.2708 | — |
| REF 1 B | Fabric B | 3.7185 | 3.9135 | — | 2.1279 | — | 1.9595 | 0.8009 | — |
| REF 2 B | Fabric A | 9.8329 | 3.0012 | — | 2.5713 | — | 0.8492 | 0.0314 | — |
| REF 2 B | Fabric B | 3.9054 | 1.3924 | — | 1.0223 | — | 0.2270 | 0.0466 | — |
| Dermulsene ™ 1B | Fabric A | 3.7806 | 2.3753 | — | 0.2419 | — | 0.0905 | 0.0546 | — |
| Dermulsene ™ 7B | Fabric B | 1.6406 | 0.6429 | — | 0.6925 | — | 0.0675 | 0.0881 | — |
| Dermulsene ™ 9B | Fabric B | 1.8189 | 0.1812 | 0.2734 | — | 0.0417 | 0.0629 | — | 0.0230 |

TABLE 2A

Tackiness Test Results for Snowtack ™ Product Without RFL

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Production REF | Fabric A | 235.19 | 17.90 | 7.61 | 8.2187 | 8.8737 | 6.7889 | 5.5824 |
| Mix With Modicol | Fabric B | 195.20 | 33.83 | 17.33 | 5.9624 | 2.7116 | 4.0883 | 7.0928 |
| Mix Without Modicol | Fabric B | 198.05 | 36.68 | 18.52 | 4.9759 | 3.2948 | 4.0952 | 3.7473 |
| Snowtack ™ 100 G (1A) | Fabric B | 184.87 | 23.50 | 12.71 | 3.3393 | 1.5573 | 3.4972 | 3.7442 |
| Snowtack ™ 779 F (3A) | Fabric B | 194.87 | 33.50 | 17.19 | 13.0480 | 15.1720 | 8.7224 | 14.1290 |
| Snowtack ™ SE 780 G (5A) | Fabric B | 174.31 | 12.94 | 7.42 | 9.9530 | 3.8707 | 2.8077 | 8.2586 |
| Snowtack ™ SE 780 K (7A) | Fabric B | 182.84 | 21.47 | 11.74 | 2.5978 | 3.0710 | 1.4360 | 2.8041 |

TABLE 2B

Tackiness Test Results for Snowtack ™ Product With RFL

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Production REF | Fabric A | 235.19 | 17.90 | 7.61 | 8.2187 | 8.8737 | 6.7889 | 5.5824 |
| Mix With Modicol | Fabric B | 204.54 | 43.17 | 21.11 | 4.6588 | 5.7341 | 4.7128 | 3.7185 |
| Mix Without Modicol | Fabric B | 187.82 | 26.45 | 14.08 | 4.0540 | 3.0475 | 3.2835 | 3.9054 |
| Snowtack ™ 100 G (1B) | Fabric B | 181.70 | 20.33 | 11.19 | 19.0990 | 15.3380 | 10.4220 | 14.6150 |
| Snowtack ™ 779 F (3B) | Fabric B | 176.45 | 15.08 | 8.55 | 10.8130 | 5.6741 | 4.0371 | 10.2140 |
| Snowtack ™ SE 780 G (5B) | Fabric B | 177.11 | 15.74 | 8.89 | 4.8495 | 8.1488 | 14.4150 | 7.1137 |
| Snowtack ™ SE 780 K (7B) | Fabric B | 176.07 | 14.70 | 8.35 | 1.9937 | 2.3742 | 1.9160 | 1.4924 |

TABLE 2C

Aging Test Results for Snowtack ™ Product Without RFL

| Sample | Fabric | Tacky Level (F/F) (Newtons) At Time Intervals 0 | 24 | 72 | 120 | 168 | 240 | 288 |
|---|---|---|---|---|---|---|---|---|
| REF 1 A | Fabric B | 7.0928 | 5.1722 | 3.6980 | — | 1.5491 | 1.3177 | — |
| REF 2 A | Fabric B | 3.7473 | 3.9516 | 3.4607 | — | 0.7477 | 1.5362 | — |
| Snowtack ™ 1A | Fabric B | 3.7442 | 1.7690 | — | 0.4574 | 0.0276 | — | 0.2219 |
| Snowtack ™ 3A | Fabric B | 14.1290 | 3.8231 | — | 1.2596 | 1.5024 | — | 0.0183 |

TABLE 2D

Aging Test Results for Snowtack™ Product With RFL

| | | Tacky Level (F/F) (Newtons) At Time Intervals | | | | | | |
|---|---|---|---|---|---|---|---|---|
| Sample | Fabric | 0 | 24 | 72 | 120 | 168 | 240 | 288 |
| REF 1 B | Fabric B | 3.7185 | 3.9135 | 2.1279 | — | 1.9595 | 0.8009 | — |
| REF 2 B | Fabric B | 3.9054 | 1.3924 | 1.0223 | — | 0.2270 | 0.0466 | — |
| Snowtack™ 1B | Fabric B | 14.6150 | 4.0813 | — | 0.7054 | 0.1629 | — | 0.2022 |
| Snowtack™ 3B | Fabric B | 10.2140 | 2.3608 | — | 1.1476 | 0.0614 | — | 0.0064 |

TABLE 3A

Tackiness Test Results for Aquatac ® Product Without RFL

| | | DPU | | | Tacky (F/F) (Newtons) | | | |
|---|---|---|---|---|---|---|---|---|
| | | Total | | | | | | |
| Sample | Fabric | g/m² | g/m³ | % | I/I/90° | K/K/90° | K/I/90° | K/I/0° |
| Production REF | Fabric A | 235.19 | 17.90 | 7.61 | 8.2187 | 8.8737 | 6.7889 | 5.5824 |
| Mix With Modicol | Fabric A | 255.58 | 38.29 | 14.98 | 23.1370 | 13.1360 | 15.2900 | 16.2940 |
| Mix Without Modicol | Fabric A | 260.06 | 42.77 | 16.45 | 16.6280 | 8.8056 | 10.2560 | 12.0160 |
| Aquatac ® XR 4316 (1A) | Fabric A | 246.92 | 29.63 | 12.00 | — | — | — | 41.283 |

TABLE 3B

Tackiness Test Results for Aquatac ® Product With RFL

| | | DPU | | | Tacky (F/F) (Newtons) | | | |
|---|---|---|---|---|---|---|---|---|
| | | Total | | | | | | |
| Sample | Fabric | g/m² | g/m³ | % | I/I/90° | K/K/90° | K/I/90° | K/I/0° |
| Production REF | Fabric A | 235.19 | 17.90 | 7.61 | 8.2187 | 8.8737 | 6.7889 | 5.5824 |
| Mix With Modicol | Fabric A | 247.39 | 30.10 | 12.17 | 13.2470 | 10.6690 | 10.0680 | 10.8160 |
| Mix Without Modicol | Fabric A | 237.84 | 20.55 | 8.64 | 6.2958 | 11.2400 | 9.2775 | 9.8329 |
| Aquatac ® XR 4316 (1B) | Fabric A | 243.92 | 26.63 | 10.92 | 36.0130 | 14.7050 | 22.9610 | 25.5210 |

TABLE 4A

Tackiness Test Results for Struktol ® (Struktol-1) Product Without RFL

| | | DPU | | | Tacky (F/F) (Newtons) | | | |
|---|---|---|---|---|---|---|---|---|
| | | Total | | | | | | |
| Sample | Fabric | g/m² | g/m³ | % | I/I/90° | K/K/90° | K/I/90° | K/I/0° |
| Production REF | Fabric A | 235.19 | 17.90 | 7.61 | 8.2187 | 8.8737 | 6.7889 | 5.5824 |
| Mix With Modicol | Fabric A | 255.58 | 38.29 | 14.98 | 23.1370 | 13.1360 | 15.2900 | 16.2940 |

TABLE 4A-continued

Tackiness Test Results for Struktol ® (Struktol-1) Product Without RFL

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Mix Without Modicol | Fabric A | 260.06 | 42.77 | 16.45 | 16.6280 | 8.8056 | 10.2560 | 12.0160 |
| Struktol ® LT 159 (1A) | Fabric A | 269.78 | 52.49 | 19.46 | — | — | — | 19.145 |
| Struktol ® LT 356 (3A) | Fabric A | 262.86 | 45.57 | 17.34 | — | — | — | 18.306 |
| Struktol ® XP 4392 (5A) | Fabric A | 260.08 | 42.79 | 16.45 | — | — | — | 31.535 |
| Struktol ® XP 4394 (7A) | Fabric A | 257.53 | 40.24 | 15.63 | — | — | — | 21.960 |
| Struktol ® XP 4395 (9A) | Fabric A | 258.79 | 41.50 | 16.04 | — | — | — | 27.549 |
| Struktol ® XP 4397 (11A) | Fabric A | 256.26 | 38.97 | 15.21 | — | — | — | 16.285 |
| Struktol ® XP 4398 (13A) | Fabric A | 256.27 | 38.98 | 15.21 | — | — | — | 29.552 |

TABLE 4B

Tackiness Test Results for Struktol ® (Struktol-1) Product With RFL

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Production REF | Fabric A | 235.19 | 17.90 | 7.61 | 8.2187 | 8.8737 | 6.7889 | 5.5824 |
| Mix With Modicol | Fabric A | 247.39 | 30.10 | 12.17 | 13.2470 | 10.6690 | 10.0680 | 10.8160 |
| Mix Without Modicol | Fabric A | 237.84 | 20.55 | 8.64 | 6.2958 | 11.2400 | 9.2775 | 9.8329 |
| Struktol ® LT 159 (1B) | Fabric A | 252.55 | 35.26 | 13.96 | 11.7220 | 14.1140 | 15.5380 | 16.560 |
| Struktol ® LT 356 (3B) | Fabric A | 259.70 | 42.41 | 16.33 | 13.9080 | 12.0940 | 15.3040 | 25.034 |
| Struktol ® XP 4392 (5B) | Fabric A | 256.62 | 39.33 | 15.33 | 23.9750 | 25.1890 | 25.2840 | 26.003 |
| Struktol ® XP 4394 (7B) | Fabric A | 254.62 | 37.33 | 14.66 | 29.8520 | 16.2330 | 17.9780 | 24.212 |
| Struktol ® XP 4395 (9B) | Fabric A | 250.53 | 33.24 | 13.27 | 25.6810 | 20.9740 | 19.5760 | 33.657 |
| Struktol ® XP 4397 (11B) | Fabric A | 251.98 | 34.69 | 13.77 | 24.3270 | 15.6500 | 12.4470 | 18.082 |
| Struktol ® XP 4398 (13B) | Fabric A | 259.07 | 41.78 | 16.13 | 25.2920 | 18.6070 | 15.4810 | 23.623 |

TABLE 4B

Tackiness Test Results for Struktol ® (Struktol-1) Product With RFL (cont.)

| Sample | Tacky Level Fabric to Tire Rubber 1 (F/TR1) (Newtons/5 cm) I/TR1 | K/TR1 | Tacky Level Fabric to Tire Rubber 2 (F/TR2) (Newtons/5 cm) I/TR2 | K/TR2 | Adhesion to Tire Rubber 2 (Newtons/mm) Belt | Base tread |
|---|---|---|---|---|---|---|
| Production REF | 9.1 | 10.9 | 1.0 | 4.3 | 11.19 | 13.71 |
| Mix With Modicol | No fabric available | — | — | — | — | — |
| Mix Without Modicol | No fabric available | — | — | — | — | — |
| Struktol ® LT 159 (1B) | 7.4 | 13.4 | No fabric available | No fabric available | 20.95 | 11.98 |
| Struktol ® LT 356 (3B) | 5.5 | 7.6 | No fabric available | No fabric available | 16.15 | 9.65 |
| Struktol ® XP 4392 (5B) | 8.0 | 6.4 | No fabric available | No fabric available | 13.13 | 9.27 |
| Struktol ® XP 4394 (7B) | 6.3 | 5.4 | No fabric available | No fabric available | 15.14 | 18.70 |
| Struktol ® XP 4395 (9B) | 6.1 | 7.5 | 3.0 | 2.3 | 19.24 | 19.08 |
| Struktol ® XP 4397 (11B) | 5.5 | 8.4 | No fabric available | No fabric available | 14.03 | 15.68 |
| Struktol ® χP 4398 (13B) | 7.3 | 8.3 | No fabric available | No fabric available | 19.56 | 17.92 |

TABLE 4D

Aging Test Results for Struktol ® (Struktol-1) Product With RFL

| Sample | Fabric | Tacky Level (F/F) (Newtons) At Time Intervals | | | | | | |
|---|---|---|---|---|---|---|---|---|
| | | 0 | 24 | 48 | 72 | 96 | 168 | 240 |
| Production REF | Fabric A | 5.5824 | 10.5780 | 7.9430 | 7.7150 | 3.5387 | 2.8474 | 3.6169 |
| Mix With Modicol | Fabric A | 10.8160 | 7.5774 | — | 4.8813 | — | 0.3320 | 0.2708 |
| Mix Without Modicol | Fabric A | 9.8329 | 3.0012 | — | 2.5713 | — | 0.8492 | 0.0314 |
| Struktol ® LT 159 (1B) | Fabric A | 16.560 | 23.4580 | 23.2775 | 13.0485 | 8.4412 | 4.5498 | 0.2596 |
| Struktol ® LT 356 (3B) | Fabric A | 25.034 | 9.4993 | 6.3933 | 6.5409 | 6.3207 | 1.3080 | 0.9723 |
| Struktol ® XP 4392 (5B) | Fabric A | 26.003 | 13.8345 | 10.9105 | 8.1737 | 5.7903 | 1.6289 | 0.3541 |
| Struktol ® XP 4394 (7B) | Fabric A | 24.212 | 14.9852 | 16.9025 | 10.3266 | 6.6474 | 4.0215 | 1.4050 |
| Struktol ® XP 4395 (9B) | Fabric A | 33.657 | 11.2449 | 9.0429 | 9.7567 | 6.1857 | 2.3449 | 1.8660 |
| Struktol ® XP 4397 (11B) | Fabric A | 18.082 | 8.3461 | 7.7371 | 7.7476 | 1.1126 | 1.9236 | 0.0025 |
| Struktol ® XP 4398 (13B) | Fabric A | 23.623 | 6.9250 | 4.9950 | 3.3023 | 0.6821 | 0.2397 | 0.0150 |

TABLE 5

Tackiness Test Results for Struktol ® (Struktol-2) Product

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Production REF | Fabric A | 235.19 | 235.19 | 100.00 | 8.2187 | 8.8737 | 6.7889 | 5.5824 |
| REF 1 A | Fabric A | 255.58 | 38.29 | 14.98 | 23.1370 | 13.1360 | 15.2900 | 16.2940 |
| REF 1 B | Fabric A | 247.39 | 30.10 | 12.17 | 13.2470 | 10.6690 | 10.0680 | 10.8160 |
| REF 2 A | Fabric A | 260.06 | 42.77 | 16.45 | 16.6280 | 8.8056 | 10.2560 | 12.0160 |
| REF 2 B | Fabric A | 237.84 | 20.55 | 8.64 | 6.2958 | 11.2400 | 9.2775 | 9.8329 |
| Struktol ® 1 A | Fabric A | 266.05 | 48.76 | 18.33 | 13.3340 | 10.7390 | 12.5940 | 10.720 |
| Struktol ® 1 B | Fabric A | 255.84 | 38.55 | 15.07 | 12.0600 | 11.3750 | 13.9440 | 10.704 |
| Struktol ® 1 C | Fabric A | 261.67 | 44.38 | 16.96 | 10.6480 | 10.9320 | 11.5130 | 9.003 |
| Struktol ® 2 A | Fabric A | 269.56 | 52.27 | 19.39 | 14.6490 | 9.3176 | 11.3570 | 9.368 |
| Struktol ® 2 B | Fabric A | 257.05 | 39.76 | 15.47 | 10.8920 | 10.4640 | 11.1170 | 9.391 |
| Struktol ® 2 C | Fabric A | 254.66 | 37.37 | 14.67 | 11.1890 | 10.5850 | 11.2940 | 11.305 |
| Struktol ® 3 A | Fabric A | 260.97 | 43.68 | 16.74 | 16.4310 | 8.7419 | 12.2710 | 9.799 |
| Struktol ® 3 B | Fabric A | 259.48 | 42.19 | 16.26 | 8.2276 | 9.8091 | 9.6345 | 8.280 |
| Struktol ® 3 C | Fabric A | 251.38 | 34.09 | 13.56 | 15.1800 | 9.9150 | 11.3060 | 10.419 |
| Struktol ® 4 A | Fabric A | 256.97 | 39.68 | 15.44 | 8.2427 | 10.1960 | 9.4816 | 10.043 |
| Struktol ® 4 B | Fabric A | 255.53 | 38.24 | 14.96 | 8.9236 | 9.4967 | 10.2070 | 9.346 |
| Struktol ® 4 C | Fabric A | 252.54 | 35.25 | 13.96 | 11.4300 | 11.5910 | 11.4320 | 9.476 |
| Struktol ® 5 A | Fabric A | 267.31 | 50.02 | 18.71 | 13.0230 | 7.9985 | 11.6950 | 8.649 |
| Struktol ® 5 B | Fabric A | 257.88 | 40.59 | 15.74 | 22.4690 | 11.9960 | 12.7380 | 14.196 |
| Struktol ® 5 C | Fabric A | 250.26 | 32.97 | 13.17 | 15.1640 | 12.6470 | 13.1650 | 8.479 |
| Struktol ® 6 A | Fabric A | 260.47 | 43.18 | 16.58 | 15.2870 | 9.2837 | 8.9205 | 10.437 |
| Struktol ® 6 B | Fabric A | 255.51 | 38.22 | 14.96 | 20.9650 | 10.3770 | 18.0460 | 13.458 |
| Struktol ® 6 C | Fabric A | 246.10 | 28.81 | 11.71 | 18.2780 | 6.8844 | 12.9070 | 13.146 |

TABLE 6A

Tackiness Test Results for Struktol ® (Struktol-3) Product

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Production REF | Fabric A | 235.19 | 17.90 | 7.61 | 8.2187 | 8.8737 | 6.7889 | 5.5824 |
| Mix With Modicol | Fabric A | 255.58 | 38.29 | 14.98 | 23.1370 | 13.1360 | 15.2900 | 16.2940 |
| Mix With Modicol + RFL | Fabric A | 247.39 | 30.10 | 12.17 | 13.2470 | 10.6690 | 10.0680 | 10.8160 |
| Mix Without Modicol | Fabric A | 260.06 | 42.77 | 16.45 | 16.6280 | 8.8056 | 10.2560 | 12.0160 |

TABLE 6A-continued

Tackiness Test Results for Struktol ® (Struktol-3) Product

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Mix Without Modicol + RFL | Fabric A | 237.84 | 20.55 | 8.64 | 6.2958 | 11.2400 | 9.2775 | 9.8329 |
| Struktol ® XP 4395 (9B) | Fabric A | 250.53 | 33.24 | 13.27 | 25.6810 | 20.9740 | 19.5760 | 33.657 |
| Struktol ® LT 356 (3D) | Fabric A | 261.22 | 43.93 | 16.82 | 8.9947 | 8.9313 | 13.8970 | 10.793 |
| Struktol ® XP 4392 (5D) | Fabric A | 260.97 | 43.68 | 16.74 | 31.0440 | 26.8750 | 27.9300 | 28.578 |
| Struktol ® XP 4394 (7D) | Fabric A | 256.45 | 39.16 | 15.27 | 30.3530 | 20.6120 | 21.4210 | 20.749 |
| Struktol ® XP 4395 (9B) | Fabric A | 240.71 | 23.42 | 9.73 | 45.6260 | 38.5690 | 38.8340 | 40.164 |
| Struktol ® XP 4395 na 45" @ 180° C. | Fabric A | — | — | — | 23.3960 | 10.6200 | 18.7460 | 16.827 |
| Struktol ® XP 4395 + TMQ (9 B + TMQ) | Fabric A | 260.52 | 43.23 | 16.59 | 33.0780 | 21.0780 | 27.1540 | 26.413 |
| Struktol ® XP 4395 (9D) | Fabric A | 267.17 | 49.88 | 18.67 | 27.6200 | 13.3110 | 20.8000 | 19.459 |
| Struktol ® XP 4399 (15A) | Fabric A | 259.29 | 42.00 | 16.20 | 36.1370 | 34.2170 | 38.8750 | 30.817 |
| Struktol ® XP 4399 (15B) | Fabric A | 265.07 | 47.78 | 18.03 | 32.8380 | 27.5940 | 30.5430 | 23.617 |

TABLE 6A

Tackiness Test Results for Struktol ® (Struktol-3) Product (cont.)

| Sample | Tacky Level Fabric to Tire Rubber 1 (F/TR1) (Newtons/5 cm) I/TR1 | K/TR1 | Adhesion to Tire Rubber 3 (Newtons/mm) Belt | Under tread |
|---|---|---|---|---|
| Production REF | 9.1 | 10.9 | 7.31 | 6.74 |
| Mix With Modicol | No fabric available | | | |
| Mix With Modicol + RFL | No fabric available | | | |
| Mix Without Modicol | No fabric available | | | |
| Mix Without Modicol + RFL | No fabric available | | | |
| Struktol ® XP 4395 (9B) | 6.1 | 7.5 | No fabric available | |
| Struktol ® LT 356 (3D) | 5.1 | 5.7 | 6.44 | 6.96 |
| Struktol ® XP 4392 (5D) | 4.8 | 4.8 | 7.22 | 6.98 |
| Struktol ® XP 4394 (7D) | 4.7 | 3.7 | 7.14 | 6.58 |
| Struktol ® XP 4395 (9B) | 6.9 | 4.3 | 7.46 | 6.95 |
| Struktol ® XP 4395 na 45" @180° C. | — | — | — | — |
| Struktol ® XP 4395 + TMQ (9 B + TMQ) | 5.2 | 5.0 | 6.59 | 7.71 |
| Struktol ® XP 4395 (9D) | 4.9 | 4.9 | 6.66 | 7.11 |
| Struktol ® XP 4399 (15A) | 9.2 | 7.7 | 6.51 | 7.46 |
| Struktol ® XP 4399 (15B) | — | — | — | — |

TABLE 6B

Aging Test Results for Struktol ® (Struktol-3) Product

| Sample | Fabric | Tacky Level (F/F) (Newtons) At Time Intervals | | | | | | |
|---|---|---|---|---|---|---|---|---|
| | | 0 | 24 | 48 | 72 | 96 | 168 | 240 |
| Production REF | Fabric A | 5.5824 | 10.5780 | 7.9430 | 7.7150 | 3.5387 | 2.8474 | 3.6169 |
| Mix With Modicol | Fabric A | 10.8160 | 7.5774 | — | 4.8813 | — | 0.3320 | 0.2708 |
| Mix Without Modicol | Fabric A | 9.8329 | 3.0012 | — | 2.5713 | — | 0.8492 | 0.0314 |
| Struktol ® XP 4395 (9B) | Fabric A | 33.657 | 11.2449 | 9.0429 | 9.7567 | 6.1857 | 2.3449 | 1.8660 |
| Struktol ® LT 356 (3D) | Fabric A | 10.793 | 3.0145 | 6.5397 | 3.0233 | 1.7336 | 2.0415 | 0.0465 |
| Struktol ® XP 4392 (5D) | Fabric A | 28.578 | 14.5355 | 19.0550 | 12.2070 | 7.1411 | 4.8426 | 0.4500 |
| Struktol ® XP 4394 (7D) | Fabric A | 20.749 | 10.8749 | 15.2165 | 9.3733 | 9.7307 | 6.6972 | 1.1401 |
| Struktol ® XP 4395 (9B) | Fabric A | 40.164 | 13.1905 | 8.2240 | 8.4786 | 6.2426 | 8.2888 | 2.8078 |
| Struktol ® XP 4395 + TMQ (9 B + TMQ) | Fabric A | 26.413 | 2.5740 | 3.2254 | 3.1982 | 3.3334 | 1.5980 | 0.9516 |
| Struktol ® XP 4395 (9D) | Fabric A | 19.459 | 6.8719 | 5.6360 | 8.2669 | 8.4955 | 1.0758 | 0.1592 |
| Struktol ® XP 4399 (15B) | Fabric A | 23.617 | 6.6596 | 5.4945 | 5.5293 | 4.4350 | 4.3473 | 0.9707 |

TABLE 7A

Tackiness Test Results for Struktol ® (Struktol-4) Product

| Sample | Fabric | DPU Total | | | Tacky (F/F) (Newtons) | | | |
|---|---|---|---|---|---|---|---|---|
| | | g/m² | g/m³ | % | I/I/90° | K/K/90° | K/I/90° | K/I/0° |
| Production REF | Fabric A | 235.19 | 17.90 | 7.61 | 8.2187 | 8.8737 | 6.7889 | 5.5824 |
| Mix With Modicol | Fabric A | 255.58 | 38.29 | 14.98 | 23.1370 | 13.1360 | 15.2900 | 16.2940 |
| Mix With Modicol + RFL | Fabric A | 247.39 | 30.10 | 12.17 | 13.2470 | 10.6690 | 10.0680 | 10.8160 |
| Mix Without Modicol | Fabric A | 260.06 | 42.77 | 16.45 | 16.6280 | 8.8056 | 10.2560 | 12.0160 |
| Mix Without Modicol + RFL | Fabric A | 237.84 | 20.55 | 8.64 | 6.2958 | 11.2400 | 9.2775 | 9.8329 |
| Struktol ® XP 4395 (9B) | Fabric A | 250.53 | 33.24 | 13.27 | 25.6810 | 20.9740 | 19.5760 | 33.657 |
| Struktol ® XP 4395 (9B) | Fabric A | 240.71 | 23.42 | 9.73 | 45.6260 | 38.5690 | 38.8340 | 40.164 |
| Struktol ® XP 4395 (9B) | Fabric A | 255.52 | 38.23 | 14.96 | 31.2450 | 23.3190 | 24.9000 | 22.5217 |
| Struktol ® XP 4395 (9Ba) + Struktol ® XP 4400 | Fabric A | 273.73 | 56.44 | 20.62 | 31.8140 | 25.0390 | 25.8300 | 25.0440 |
| Struktol ® XP 4395 (9Bb) + Struktol ® XP 4402 | Fabric A | 268.91 | 51.62 | 19.20 | 22.3720 | 18.5180 | 26.4830 | 26.3263 |
| Struktol ® XP 4395 (9Bc) + Aquamix ™ 111# | Fabric A | 259.69 | 42.40 | 16.33 | 33.1010 | 19.7290 | 24.0090 | 24.2700 |
| Struktol XP 4395 (9 Bd) + Penacolite Resin I-168-L | Fabric A | 252.42 | 35.13 | 13.92 | 22.2640 | 24.6170 | 25.7380 | 25.8390 |
| Struktol ® XP 4395 (9Be) + Bismaleimide | Fabric A | 268.68 | 51.39 | 19.13 | 40.1230 | 23.0940 | 32.5290 | 27.9547 |

TABLE 7A-continued

Tackiness Test Results for Struktol ® (Struktol-4) Product

| | | DPU | | | Tacky (F/F) (Newtons) | | | |
|---|---|---|---|---|---|---|---|---|
| | | Total | | | | | | |
| Sample | Fabric | g/m² | g/m³ | % | I/I/90° | K/K/90° | K/I/90° | K/I/0° |
| Struktol ® XP 4395 (9Bf) + Aquamix ™ 111# + I-168-L + Bismaleimide | Fabric A | 247.20 | 29.91 | 12.10 | 31.3630 | 18.6670 | 20.7280 | 24.7920 |
| Struktol ® XP 4395/Struktol ® XP 4399 (9Bg) + Penacolite Resin I-168-L | Fabric A | 258.76 | 41.47 | 16.03 | 27.3270 | 20.9630 | 24.5910 | 24.2560 |

TABLE 7A

Tackiness Test Results for Struktol ® (Struktol-4) Product (cont.)

| | Tacky Level Fabric to Tire Rubber 1 (F/TR1) | | Adhesion to Tire Rubber 3 (Newtons/mm) | |
|---|---|---|---|---|
| | (Newtons/5 cm) | | | Under |
| Sample | I/TR1 | K/TR1 | Belt | tread |
| Production REF | 9.1 | 10.9 | 7.31 | 6.74 |
| Mix With Modicol | No fabric available | | | |
| Mix With Modicol + RFL | No fabric available | | | |
| Mix Without Modicol | No fabric available | | | |
| Mix Without Modicol + RFL | No fabric available | | | |
| Struktol ® XP 4395 (9B) | 6.1 | 7.5 | No fabric available | |
| Struktol ® XP 4395 (9B) | 6.9 | 4.3 | 7.46 | 6.95 |
| Struktol ® XP 4395 (9B) | 9.3 | 8.1 | 7.25 | 7.43 |
| Struktol ® XP 4395 (9Ba) + Struktol ® XP 4400 | 7.0 | 7.8 | 7.38 | 6.80 |
| Struktol ® XP 4395 (9Bb) + Struktol ® XP 4402 | 10.5 | 10.1 | 7.11 | 7.31 |
| Struktol ® XP 4395 (9Bc) + Aquamix ™ 111# | 8.1 | 8.3 | 8.02 | 6.75 |
| Struktol XP 4395 (9 Bd) + Penacolite Resin I-168-L | 10.2 | 10.0 | 8.09 | 6.97 |
| Struktol ® XP 4395 (9Be) + Bismaleimide | 7.5 | 7.7 | 7.36 | 6.93 |
| Struktol ® XP 4395 (9Bf) + Aquamix ™ 111# + I-168-L + Bismaleimide | 7.8 | 7.8 | 8.78 | 7.14 |
| Struktol XP 4395/ Struktol ® XP 4399 (9Bg) + Penacolite Resin I-168-L | 9.5 | 7.2 | 7.97 | 6.59 |

TABLE 7B

Aging Test Results for Struktol ® (Struktol-4) Product

| | | Tacky Level (F/F) (Newtons) At Time Intervals | | | | | | |
|---|---|---|---|---|---|---|---|---|
| Sample | Fabric | 0 | 24 | 48 | 72 | 96 | 168 | 240 |
| Production REF | Fabric A | 5.5824 | 10.5780 | 7.9430 | 7.7150 | 3.5387 | 2.8474 | 3.6169 |
| Mix With Modicol + RFL | Fabric A | 10.8160 | 7.5774 | — | 4.8813 | — | 0.3320 | 0.2708 |
| Mix Without Modicol + RFL | Fabric A | 9.8329 | 3.0012 | — | 2.5713 | — | 0.8492 | 0.0314 |
| Struktol ® XP 4395 (9B) | Fabric A | 33.657 | 11.2449 | 9.0429 | 9.7567 | 6.1857 | 2.3449 | 1.8660 |
| Struktol ® XP 4395 (9B) | Fabric A | 40.164 | 13.1905 | 8.2240 | 8.4786 | 6.2426 | 8.2888 | 2.8078 |
| Struktol ® XP 4395 (9B) | Fabric A | 22.5217 | 6.2746 | 6.1279 | 4.9981 | — | 1.1563 | 0.2171 |
| Struktol ® XP 4395 (9 Ba) + Struktol XP 4400 | Fabric A | 25.0440 | 9.4289 | 5.2348 | 8.5538 | — | 0.9433 | 0.7699 |
| Struktol ® XP 4395 (9 Bb) + Struktol ® XP 4402 | Fabric A | 26.3263 | 3.9868 | 5.0503 | 1.6823 | — | 1.4047 | 0.5049 |
| Struktol ® XP 4395 (9 Bc) + Aquamix ™ 111# | Fabric A | 24.2700 | 8.6589 | 4.7324 | 2.4997 | — | 0.1597 | 0.0487 |
| Struktol ® XP 4395 (9 Bd) + Penacolite Resin I-168-L | Fabric A | 25.8390 | 6.6869 | 8.8907 | 6.4971 | — | 2.6024 | 1.0672 |
| Struktol ® XP 4395 (9 Be) + Bismaleimide | Fabric A | 27.9547 | 4.0500 | 7.9711 | 3.8465 | — | 1.4788 | 0.2132 |

TABLE 7B-continued

Aging Test Results for Struktol ® (Struktol-4) Product

| Sample | Fabric | Tacky Level (F/F) (Newtons) At Time Intervals | | | | | | |
|---|---|---|---|---|---|---|---|---|
| | | 0 | 24 | 48 | 72 | 96 | 168 | 240 |
| Struktol ® XP 4395 (9 Bf) + Aquamix ™ 111# + I-168-L + Bismaleimide | Fabric A | 24.7920 | 4.4309 | 7.6911 | 2.2549 | — | 1.4763 | 0.3084 |
| Struktol ® XP 4395/ Struktol XP 4399 (9 Bg) + Penacolite Resin I-168-L | Fabric A | 24.2560 | 8.7784 | 4.3710 | 4.3643 | — | 1.0608 | 0.4155 |

TABLE 8A

Tackiness Test Results for Aquamix ™ Product Without RFL

| Sample | Fabric | DPU Total | | | Tacky (F/F) (Newtons) | | | |
|---|---|---|---|---|---|---|---|---|
| | | g/m² | g/m³ | % | I/I/90° | K/K/90° | K/I/90° | K/I/0° |
| Production REF | Fabric A | 235.19 | 17.90 | 7.61 | 8.2187 | 8.8737 | 6.7889 | 5.5824 |
| Mix Without Modicol | Fabric A | 260.06 | 42.77 | 16.45 | 16.6280 | 8.8056 | 10.2560 | 12.0160 |
| Mix Without Modicol + RFL | Fabric A | 237.84 | 20.55 | 8.64 | 6.2958 | 11.2400 | 9.2775 | 9.8329 |
| Aquamix ™ 814 # (1A) | Fabric A | 255.49 | 38.20 | 14.95 | 35.912 | 32.595 | 39.268 | 31.4607 |
| Aquamix ™ 570 # (5A) | Fabric A | 257.18 | 39.89 | 15.51 | 7.6075 | 13.625 | 7.7216 | 6.0545 |
| Aquamix ™ 569 # (7A) | Fabric A | 269.44 | 52.15 | 19.35 | 10.438 | 11.086 | 13.195 | 7.9024 |

TABLE 8B

Tackiness Test Results for Aquamix ™ Product With RFL

| Sample | Fabric | DPU Total | | | Tacky (F/F) (Newtons) | | | |
|---|---|---|---|---|---|---|---|---|
| | | g/m² | g/m³ | % | I/I/90° | K/K/90° | K/I/90° | K/I/0° |
| Production REF | Fabric A | 235.19 | 17.90 | 7.61 | 8.2187 | 8.8737 | 6.7889 | 5.5824 |
| Mix With Modicol | Fabric A | 255.58 | 38.29 | 14.98 | 23.1370 | 13.1360 | 15.2900 | 16.2940 |
| Mix With Modicol + RFL | Fabric A | 247.39 | 30.10 | 12.17 | 13.2470 | 10.6690 | 10.0680 | 10.8160 |
| Aquamix ™ 814 # (1B) | Fabric A | 257.76 | 40.47 | 15.70 | 32.8040 | 23.9000 | 22.5880 | 24.1857 |
| Aquamix ™ 570 # (5B) | Fabric A | 246.06 | 28.77 | 11.69 | 6.6083 | 10.1620 | 5.9597 | 5.1484 |
| Aquamix ™ 569 # (7B) | Fabric A | 252.20 | 34.91 | 13.84 | 7.5670 | 8.3389 | 8.8675 | 8.2230 |

TABLE 8B

Tackiness Test Results for Aquamix™ Product With RFL (cont.)

| Sample | Fabric | Tacky Level Fabric to Tire Rubber 1 (F/TR1) (Newtons/5 cm) | | Adhesion to Tire Rubber 3 (Newtons/mm) | |
|---|---|---|---|---|---|
| | | I/TR1 | K/TR1 | Belt | Under tread |
| Production REF | Fabric A | 9.1 | 10.9 | 7.31 | 6.74 |
| Mix With Modicol | Fabric A | No fabric available | | | |
| Mix With Modicol + RFL | Fabric A | No fabric available | | | |
| Aquamix™ 814 # (1B) | Fabric A | 8.4 | 11.9 | 8.62 | 7.69 |
| Aquamix™ 570 # (5B) | Fabric A | — | — | — | — |
| Aquamix™ 569 # (7B) | Fabric A | — | — | — | — |

TABLE 8C

Aging Test Results for Aquamix™ Product

| Sample | Fabric | Tacky Level (F/F) (Newtons) At Time Intervals | | | | | | |
|---|---|---|---|---|---|---|---|---|
| | | 0 | 24 | 48 | 72 | 96 | 168 | 240 |
| Production REF | Fabric A | 5.5824 | 10.5780 | 7.9430 | 7.7150 | 3.5387 | 2.8474 | 3.6169 |
| Mix With Modicol + RFL | Fabric A | 10.8160 | 7.5774 | — | 4.8813 | — | 0.3320 | 0.2708 |
| Mix Without Modicol + RFL | Fabric A | 9.8329 | 3.0012 | — | 2.5713 | — | 0.8492 | 0.0314 |
| Aquamix™ 814 (1B) | Fabric A | 24.1857 | 3.1870 | 4.9414 | 2.0981 | 1.2831 | 1.5653 | 0.9480 |

TABLE 9A

Tackiness Test Results (Matrix 9-A)

| Sample | Fabric | DPU | | | Tacky (F/F) (Newtons) | | | |
|---|---|---|---|---|---|---|---|---|
| | | Total g/m² | g/m³ | % | I/I/90° | K/K/90° | K/I/90° | K/I/0° |
| Production REF | Fabric A | 235.19 | 17.90 | 7.61 | 8.2187 | 8.8737 | 6.7889 | 5.5824 |
| Mix With Modicol (REF 1A) | Fabric A | 255.58 | 38.29 | 14.98 | 23.1370 | 13.1360 | 15.2900 | 16.2940 |
| Mix With Modicol + RFL (REF 1B) | Fabric A | 247.39 | 30.10 | 12.17 | 13.2470 | 10.6690 | 10.0680 | 10.8160 |
| Mix Without Modicol (REF 2A) | Fabric A | 260.06 | 42.77 | 16.45 | 16.6280 | 8.8056 | 10.2560 | 12.0160 |
| Mix Without Modicol + RFL (REF 2B) | Fabric A | 237.84 | 20.55 | 8.64 | 6.2958 | 11.2400 | 9.2775 | 9.8329 |
| Struktol ® XP 4395 (9B) | Fabric A | 250.53 | 33.24 | 13.27 | 25.681 | 20.974 | 19.576 | 33.657 |
| Struktol ® XP 4395 (9B) | Fabric A | 240.71 | 23.42 | 9.73 | 45.626 | 38.569 | 38.834 | 40.164 |
| Struktol ® XP 4395 (9B) | Fabric A | 255.52 | 38.23 | 14.96 | 31.245 | 23.319 | 24.900 | 22.522 |
| Struktol ® XP 4395 (9B) | Fabric A | 250.46 | 33.17 | 13.24 | 17.3980 | 15.2860 | 16.9040 | 13.9690 |
| (4) Struktol ® XP 4395 + Struktol ® LA 214 | Fabric A | 271.68 | 54.39 | 20.02 | 27.7800 | 22.3850 | 23.2170 | 22.1527 |
| (5) Struktol ® XP 4395 + Struktol ® LA 229 | Fabric A | 274.64 | 57.35 | 20.88 | 22.7750 | 17.6270 | 18.7140 | 17.6560 |
| (6) Struktol ® XP 4395 + Struktol ® LA 331 | Fabric A | 269.11 | 51.82 | 19.26 | 23.3640 | 16.5700 | 19.4700 | 17.2533 |
| (7) Struktol ® XP 4395 + 50% Aquanox L | Fabric A | 258.48 | 41.19 | 15.94 | 14.0470 | 12.7190 | 13.3720 | 12.2453 |
| (8) Struktol ® XP 4395 + 45% Aquanox 2246 | Fabric A | 270.02 | 52.73 | 19.53 | 22.8280 | 13.5620 | 18.0470 | 15.3570 |

TABLE 9A-continued

Tackiness Test Results (Matrix 9-A)

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| (15) Struktol ® XP 4395 + Disponil ® SLS 101 Special | Fabric A | 265.14 | 47.85 | 18.05 | 16.6770 | 14.1320 | 16.2710 | 14.7923 |
| (16) Struktol ® XP 4395 + Disponil ® SDS 15 | Fabric A | 265.77 | 48.48 | 18.24 | 18.5560 | 10.1500 | 13.3680 | 12.1922 |

TABLE 9A

Tackiness Test Results (Matrix 9-A) (cont.)

| Sample | Fabric | Tacky Level Fabric To Tire Rubber 1 (F/TR1) (Newtons/5 cm) I/TR1 | K/TR1 | Adhesion to Tire Rubber 3 (Newtons/mm) Belt | Under tread |
|---|---|---|---|---|---|
| Production REF | Fabric A | 9.1 | 10.9 | 7.31 | 6.74 |
| Mix With Modicol (REF 1A) | Fabric A | No fabric available | | | |
| Mix With Modicol + RFL (REF 1B) | Fabric A | No fabric available | | | |
| Mix Without Modicol (REF 2A) | Fabric A | No fabric available | | | |
| Mix Without Modicol + RFL (REF 2B) | Fabric A | No fabric available | | | |
| Struktol ® XP 4395 (9B) | Fabric A | 6.1 | 7.5 | No fabric available | |
| Struktol ® XP 4395 (9B) | Fabric A | 6.9 | 4.3 | 7.46 | 6.95 |
| Struktol ® XP 4395 (9B) | Fabric A | 9.3 | 8.1 | 7.25 | 7.43 |
| Struktol ® XP 4395 (9B) | Fabric A | 7.3 | 6.9 | 8.25 | 10.04 |
| (4) Struktol ® XP 4395 + Struktol ® LA 214 | Fabric A | 10.3 | 6.9 | 3.38 | 2.86 |
| (5) Struktol ® XP 4395 + Struktol ® LA 229 | Fabric A | 5.4 | 4.2 | 8.04 | 7.74 |
| (6) Struktol ® XP 4395 + Struktol ® LA 331 | Fabric A | 7.4 | 7.2 | 7.55 | 8.14 |
| (7) Struktol ® XP 4395 + 50% Aquanox L | Fabric A | 7.3 | 7.2 | 7.98 | 8.32 |
| (8) Struktol ® XP 4395 + 45% Aquanox 2246 | Fabric A | 10.1 | 8.5 | 6.84 | 7.60 |
| (15) Struktol ® XP 4395 + Disponil ® SLS 101 Special | Fabric A | 8.1 | 7.8 | 8.03 | 8.09 |
| (16) Struktol ® XP 4395 + Disponil ® SDS 15 | Fabric A | 9.2 | 7.9 | 7.71 | 7.86 |

TABLE 9B

Tackiness Test Results (Matrix 9-B)

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Production REF | Fabric A | 235.19 | 17.90 | 7.61 | 8.2187 | 8.8737 | 6.7889 | 5.5824 |
| Mix With Modicol (REF 1A) | Fabric A | 255.58 | 38.29 | 14.98 | 23.1370 | 13.1360 | 15.2900 | 16.2940 |
| Mix With Modicol + RFL (REF 1B) | Fabric A | 247.39 | 30.10 | 12.17 | 13.2470 | 10.6690 | 10.0680 | 10.8160 |
| Mix Without Modicol (REF 2A) | Fabric A | 260.06 | 42.77 | 16.45 | 16.6280 | 8.8056 | 10.2560 | 12.0160 |
| Mix Without Modicol + RFL (REF 2B) | Fabric A | 237.84 | 20.55 | 8.64 | 6.2958 | 11.2400 | 9.2775 | 9.8329 |
| Struktol ® XP 4395 (9B) | Fabric A | 250.53 | 33.24 | 13.27 | 25.681 | 20.974 | 19.576 | 33.657 |
| Struktol ® XP 4395 (9B) | Fabric A | 240.71 | 23.42 | 9.73 | 45.626 | 38.569 | 38.834 | 40.164 |
| Struktol ® XP 4395 (9B) | Fabric A | 255.52 | 38.23 | 14.96 | 31.245 | 23.319 | 24.900 | 22.522 |
| Struktol ® XP 4395 (9B) | Fabric A | 250.46 | 33.17 | 13.24 | 17.3980 | 15.2860 | 16.9040 | 13.9690 |

TABLE 9B-continued

Tackiness Test Results (Matrix 9-B)

| Sample | Fabric | DPU Total g/m² | g/m³ | % | Tacky (F/F) (Newtons) I/I/90° | K/K/90° | K/I/90° | K/I/0° |
|---|---|---|---|---|---|---|---|---|
| Struktol ® XP 4395 (9B) | Fabric A | 247.81 | 30.52 | 12.32 | 9.1274 | 6.5657 | 5.7848 | 7.2115 |
| (A) 40% Aquares T 100 H | Fabric A | 244.44 | 27.15 | 11.11 | 10.7380 | 14.7030 | 15.1840 | 14.2950 |
| (B) 60% Aquares T 20 H | Fabric A | 247.10 | 29.81 | 12.06 | 2.3962 | 2.5472 | 2.4466 | 1.4686 |
| (F) IMCD - Sample 1 | Fabric A | 251.45 | 34.16 | 13.59 | 9.1945 | 2.1227 | 2.9667 | 2.6235 |
| (9) Struktol ® XP 4395 + Hydro-Rez™ 1100 D | Fabric A | 247.17 | 29.88 | 12.09 | 4.1867 | 4.8796 | 4.1202 | 3.9861 |
| (W) Struktol ® XP 4395 + Hydro-Rez™ 1400 D | Fabric A | 242.96 | 25.67 | 10.57 | 9.2122 | 5.3474 | 7.2374 | 5.2973 |
| (11) Struktol ® XP 4395 + Hydro-Rez™ 800 E | Fabric A | 255.35 | 38.06 | 14.91 | 8.4378 | 10.6400 | 11.3990 | 8.4404 |
| (12) Struktol ® XP 4395 + Pliocord ® SB 2108 | Fabric A | 247.10 | 29.81 | 12.06 | 2.7534 | 7.9873 | 8.9242 | 7.7534 |
| (13) Struktol ® XP 4395 + Pliotec ® EL 80 | Fabric A | 249.06 | 31.77 | 12.76 | 9.3246 | 9.4860 | 8.8594 | 10.9775 |
| (14) Struktol ® XP 4395 + Pliotec ® EL 25 | Fabric A | 248.71 | 31.42 | 12.63 | 11.4930 | 6.9837 | 7.0507 | 5.0279 |

TABLE 9B

Tackiness Test Results (Matrix 9-B) (cont.)

| Sample | Fabric | Tacky Level Fabric to Tire Rubber 1 (F/TR1) (Newtons/5 cm) I/TR1 | K/TR1 | Adhesion to Tire Rubber 3 (Newtons/mm) Belt | Under tread |
|---|---|---|---|---|---|
| Production REF | Fabric A | 9.1 | 10.9 | 7.31 | 6.74 |
| Mix With Modicol (REF 1A) | Fabric A | No fabric available | | | |
| Mix With Modicol + RFL (REF 1B) | Fabric A | No fabric available | | | |
| Mix Without Modicol (REF 2A) | Fabric A | No fabric available | | | |
| Mix Without Modicol + RFL (REF 2B) | Fabric A | No fabric available | | | |
| Struktol ® XP 4395 (9B) | Fabric A | 6.1 | 7.5 | No fabric available | |
| Struktol ® XP 4395 (9B) | Fabric A | 6.9 | 4.3 | 7.46 | 6.95 |
| Struktol ® XP 4395 (9B) | Fabric A | 9.3 | 8.1 | 7.25 | 7.43 |
| Struktol ® XP 4395 (9B) | Fabric A | 7.3 | 6.9 | 8.25 | 10.04 |
| Struktol ® XP 4395 (9B) | Fabric A | 7.5 | 6.4 | 7.68 | 8.58 |
| (A) 40% Aquares T 100 H | Fabric A | 4.6 | 6.1 | 7.85 | 7.72 |
| (B) 60% Aquares T 20 H | Fabric A | 4.5 | 5.2 | 8.16 | 7.37 |
| (F) IMCD - Sample 1 | Fabric A | 6.9 | 5.2 | 7.76 | 7.48 |
| (9) Struktol ® XP 4395 + Hydro-Rez™ 1100 D | Fabric A | 7.8 | 5.1 | 7.75 | 6.84 |
| (10) Struktol ® XP 4395 + Hydro-Rez™ 1400 D | Fabric A | 4.5 | 6.1 | 8.30 | 7.46 |
| (11) Struktol ® XP 4395 + Hydro-Rez™ 800 E | Fabric A | 8.7 | 4.4 | 2.72 | 1.56 |
| (12) Struktol ® XP 4395 + Pliocord ® SB 2108 | Fabric A | 6.0 | 6.0 | 7.76 | 8.98 |
| (13) Struktol ® XP 4395 + Pliotec ® EL 80 | Fabric A | 5.1 | 4.9 | 7.56 | 7.18 |
| (14) Struktol ® XP 4395 + Pliotec ® EL 25 | Fabric A | 5.2 | 5.5 | 7.96 | 7.44 |

TABLE 9C

Aging Test Results (Matrix 9-A)

Tacky Level (F/F) (Newtons) At Time Intervals

| Sample | Fabric | 0 | 24 | 48 | 72 | 96 | 168 | 240 |
|---|---|---|---|---|---|---|---|---|
| Production REF | Fabric A | 5.5824 | 10.5780 | 7.9430 | 7.7150 | 3.5387 | 2.8474 | 3.6169 |
| Mix With Modicol + RFL | Fabric A | 10.8160 | 7.5774 | — | 4.8813 | — | 0.3320 | 0.2708 |
| Mix Without Modicol + RFL | Fabric A | 9.8329 | 3.0012 | — | 2.5713 | — | 0.8492 | 0.0314 |
| Struktol ® XP 4395 (9B) | Fabric A | 33.657 | 11.2449 | 9.0429 | 9.7567 | 6.1857 | 2.3449 | 1.8660 |
| Struktol ® XP 4395 (9B) | Fabric A | 40.164 | 13.1905 | 8.2240 | 8.4786 | 6.2426 | 8.2888 | 2.8078 |
| Struktol ® XP 4395 (9B) | Fabric A | 13.9690 | 2.1342 | 0.9767 | 1.8151 | 1.3062 | 0.5413 | 0.2671 |
| (4) Struktol ® XP 4395 + Struktol ® LA 214 | Fabric A | 22.1527 | 6.7093 | 2.2585 | 2.5136 | 1.4995 | 0.7924 | 0.6257 |
| (5) Struktol ® XP 4395 + Struktol ® LA 229 | Fabric A | 17.6560 | 3.9235 | 3.0080 | 1.2153 | 1.6016 | 0.9746 | 0.2650 |
| (6) Struktol ® XP 4395 + Struktol ® LA 331 | Fabric A | 17.2533 | 2.6124 | 1.6210 | 1.3511 | 1.4532 | 0.3618 | 0.5161 |
| (7) Struktol ® XP 4395 + 50% Aquanox L | Fabric A | 12.2453 | 1.2993 | 0.9519 | 1.6618 | 0.4760 | 0.2324 | 0.2255 |
| (8) Struktol ® XP 4395 + 45% Aquanox 2246 | Fabric A | 15.3570 | 2.2120 | 1.5886 | 1.3926 | 1.0118 | 0.9993 | 0.0789 |
| (15) Struktol ® XP 4395 + Disponil ® SLS 101 Special | Fabric A | 14.7923 | 2.8052 | 1.7640 | 0.6099 | 1.0262 | 0.1683 | 0.1169 |
| (16) Struktol ® XP 4395 + Disponil ® SDS 15 | Fabric A | 12.1922 | 2.6285 | 1.5515 | 1.0076 | 0.6098 | 0.2726 | 0.1114 |

TABLE 9D

Aging Test Results (Matrix 9-B)

Tacky Level (F/F) (Newtons) At Time Intervals

| Sample | Fabric | 0 | 24 | 48 | 72 | 96 | 168 | 240 |
|---|---|---|---|---|---|---|---|---|
| Production REF | Fabric A | 5.5824 | 10.5780 | 7.9430 | 7.7150 | 3.5387 | 2.8474 | 3.6169 |
| Mix With Modicol + RFL | Fabric A | 10.8160 | 7.5774 | — | 4.8813 | — | 0.3320 | 0.2708 |
| Mix Without Modicol + RFL | Fabric A | 9.8329 | 3.0012 | — | 2.5713 | — | 0.8492 | 0.0314 |
| Struktol ® XP 4395 (9B) | Fabric A | 33.657 | 11.2449 | 9.0429 | 9.7567 | 6.1857 | 2.3449 | 1.8660 |
| Struktol ® XP 4395 (9B) | Fabric A | 40.164 | 13.1905 | 8.2240 | 8.4786 | 6.2426 | 8.2888 | 2.8078 |
| Struktol ® XP 4395 (9B) | Fabric A | 13.9690 | 2.1342 | 0.9767 | 1.8151 | 1.3062 | 0.5413 | 0.2671 |
| Struktol ® XP 4395 (9B) | Fabric A | 7.2115 | 1.4467 | 0.3032 | 0.2485 | 0.0455 | 0.0743 | 0.0262 |
| (A) 40% Aquares T 100 H | Fabric A | 14.2950 | 10.0608 | 4.7032 | 2.8271 | 1.6437 | 0.7456 | 0.0859 |
| (B) 60% Aquares T 20 H | Fabric A | 1.4686 | 0.7280 | 0.4172 | 0.3409 | 0.0670 | 0.0157 | 0.1013 |
| (F) IMCD - Sample 1 | Fabric A | 2.6235 | 1.0101 | 0.2076 | 0.1149 | 0.1591 | 0.0854 | 0.1059 |
| (9) Struktol ® XP 4395 + Hydro-Rez ™ 1100 D | Fabric A | 3.9861 | 1.2572 | 0.1556 | 0.1545 | 0.0570 | 0.0225 | 0.0713 |
| (10) Struktol ® XP 4395 + Hydro-Rez ™ 1400 D | Fabric A | 5.2973 | 1.4870 | 0.5444 | 0.3272 | 0.3959 | 0.0075 | 0.0541 |
| (11) Struktol ® XP 4395 + Hydro-Rez ™ 800 E | Fabric A | 8.4404 | 2.0984 | 0.8567 | 1.0935 | 0.1928 | 0.0991 | 0.1012 |
| (12) Struktol ® XP 4395 + Pliocord ® SB 2108 | Fabric A | 7.7534 | 1.3560 | 0.0638 | 0.1575 | 0.0945 | 0.0266 | 0.1993 |
| (13) Struktol ® XP 4395 + Pliotec ® EL 80 | Fabric A | 10.9775 | 1.3071 | 1.7614 | 0.9357 | 0.2206 | 0.0723 | 0.1056 |
| (14) Struktol ® XP 4395 + Pliotec ® EL 25 | Fabric A | 5.0279 | 1.5665 | 0.5306 | 0.1563 | 0.1834 | 0.0863 | 0.1227 |

TABLE 10

Tackiness Test Results (Matrix 10)

| | | | Total DPU | | | Tacky (F/F) (Newtons) | | | |
|---|---|---|---|---|---|---|---|---|---|
| | Sample | Fabric | g/m² | g/m³ | % | I/I/90° | K/K/90° | K/I/90° | K/I/0° |
| Ref | RFL-2 | Fabric A | 253.42 | 36.13 | 14.26 | 6.8613 | 10.322 | 11.137 | 9.9133 |
| A | RFL - 2, replace Struktol ® XP 4395-A | Fabric A | 247.31 | 30.02 | 12.14 | 9.6316 | 5.0662 | 8.1579 | 6.4839 |
| B | RFL - 2, replace Struktol ® XP 4395-B | Fabric A | 242.35 | 25.06 | 10.34 | 1.9576 | 0.4985 | 3.3658 | 2.4326 |
| C | RFL - 2, replace Struktol ® XP 4406 | Fabric A | 250.44 | 33.15 | 13.24 | 2.8595 | 2.2936 | 4.1628 | 2.3458 |
| D | RFL - 2, replace Struktol ® XP 4407 | Fabric A | 247.60 | 30.31 | 12.24 | 5.5398 | 2.8782 | 5.7705 | 4.2796 |
| E | RFL - 2, replace Struktol ® XP 4408 | Fabric A | 246.94 | 29.65 | 12.01 | 8.286 | 8.8041 | 7.1351 | 7.4339 |
| F | RFL - 2, replace Struktol ® XP 4409 | Fabric A | 241.79 | 24.50 | 10.13 | 12.310 | 7.8718 | 9.4916 | 7.7876 |
| G | RFL - 2, replace Struktol XP 4410 | Fabric A | 252.18 | 34.89 | 13.84 | 2.5088 | 2.1243 | 1.4280 | 2.2998 |
| H | RFL - 2, replace Natural latex by G Tex GD LCV LC | Fabric A | 251.78 | 34.49 | 13.70 | 6.5206 | 7.1565 | 9.2611 | 4.8148 |
| I | RFL - 2 + 0.5% WB 3 Slurry | Fabric A | 254.93 | 37.64 | 14.76 | 17.816 | 4.7476 | 5.8065 | 8.6323 |
| J | RFL - 2 + 10% Glimmer Mica TG | Fabric A | 258.26 | 40.97 | 15.86 | 3.2311 | 3.4729 | 3.2173 | 3.9141 |
| K | RFL - 2 + 10% Glimmer Mica TF | Fabric A | 249.20 | 31.91 | 12.80 | 3.8897 | 3.0519 | 3.4894 | 3.5992 |
| L | RFL - 2 + 10% Kaolinmehl Surmin KOG | Fabric A | 244.81 | 27.52 | 11.24 | 3.4392 | 2.8097 | 2.9727 | 3.8281 |

TABLE 10-continued

Tackiness Test Results (Matrix 10) (cont.)

| | | | Tacky Level Fabric To Tire Rubber 1 (F/TR1) (Newtons/5 cm) | | Adhesion to Tire Rubber 3 (Newtons/mm) | |
|---|---|---|---|---|---|---|
| | Sample | Fabric | I/TR1 | K/TR1 | Belt | Under tread |
| Ref | RFL - 2 | Fabric A | 8.7 | 10.3 | 7.72 | 7.89 |
| A | RFL - 2, replace Struktol ® XP 4395-A | Fabric A | 8.5 | 8.2 | 7.64 | 8.53 |
| B | RFL - 2, replace Struktol ® XP 4395-B | Fabric A | 6.9 | 8.2 | 7.36 | 8.27 |
| C | RFL - 2, replace Struktol ® XP 4406 | Fabric A | 8.4 | 8.6 | 7.67 | 6.99 |
| D | RFL - 2, replace Struktol ® XP 4407 | Fabric A | 7.6 | 9.9 | 7.53 | 7.56 |
| E | RFL - 2, replace Struktol ® XP 4408 | Fabric A | 8.0 | 10.2 | 8.36 | 7.18 |
| F | RFL - 2, replace Struktol ® XP 4409 | Fabric A | 4.2 | 8.0 | 7.75 | 6.76 |
| G | RFL - 2, replace Struktol XP 4410 | Fabric A | 6.0 | 6.9 | 6.08 | 8.08 |
| H | RFL - 2, replace Natural latex by G Tex GD LCV LC | Fabric A | 7.8 | 8.8 | 7.61 | 7.88 |
| I | RFL - 2 + 0,5% WB 3 Slurry | Fabric A | 7.4 | 8.8 | 7.34 | 9.39 |
| J | RFL -2 + 10% Glimmer Mica TG | Fabric A | 7.0 | 10.0 | 8.10 | 7.50 |
| K | RFL - 2 + 10% Glimmer Mica TF | Fabric A | 4.6 | 6.3 | 8.35 | 6.82 |
| L | RFL - 2 + 10% Kaolinmehl Surmin KOG | Fabric A | 8.0 | 8.3 | 8.39 | 7.89 |

Thus, the above description and examples show that the tacky finish of the present invention provides improved adhesion over those fabrics that did not contain the tacky finish. Such improved adhesion greatly reduces the manufacturing issues associated with multiple layers of materials stacked on top of another prior to the final curing or vulcanization stage. Additionally, the test results illustrate that the tacky finish is able to adhere to an uncured rubber compound and provide good adhesion to the rubber compound after curing. Accordingly, textile materials and other articles treated with the tacky finish of the present invention possess a significant advantage over currently available prior art materials by allowing ease of application of the tacky finish to the materials and by improving the manufacturing processes for end-use articles comprising the tacky finish. As such, the present tacky finish and textiles and articles treated therewith present a useful advance over the prior art.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:

1. A method for forming a fabric-rubber composite having a tacky finish comprising the steps of:
   a) providing at least one layer of fabric, wherein the fabric is woven, knitted, nonwoven, or combinations thereof;
   b) applying a first layer of a resorcinol-formaldehyde-latex composition to at least one surface of the fabric to form a coated fabric;
   c) heating and/or curing the coated fabric to form a fabric-rubber composite;
   d) applying a second layer of a tacky finish to at least one surface of the fabric-rubber composite, wherein said tacky finish comprises:
      (i) at least one tacky resin;
      (ii) at least one unvulcanized rubber; and
      (iii) at least one adhesion promoter, wherein the adhesion promoter is resorcinol-formaldehyde resin; and
   (e) attaching the fabric-rubber composite to a tire carcass.

2. The method of claim 1, wherein the at least one tacky resin is selected from the group consisting of phenol-containing resins, aromatic resins, hydrocarbon resins, terpene resins, indene resins, coumarone resins, rosin-based resins, and mixtures thereof.

3. The method of claim 1, wherein the at least one tacky resin of the tacky finish is a rosin ester resin.

4. The method of claim 1, wherein the tacky finish further includes at least one antioxidant.

5. The method of claim 4, wherein the at least one antioxidant is selected from hindered phenol compounds, acylphenylenediamine compounds, diphenylamine compounds, mercaptan compounds, thioester compounds, thioether compounds, hydroquinoline compounds, and mixtures thereof.

6. The method of claim 1, wherein the at least one adhesion promoter includes silica.

7. The method of claim 1, wherein the fabric-rubber composite after step "d" exhibits a tack level of at least 5 N after aging in a 70° C. oven for 24 h.

8. The method of claim 1, wherein the fabric-rubber composite after step "d" exhibits a tack level of 5-30 N.

9. A method for forming a fabric-rubber composite having a tacky finish comprising the steps of:
   a) providing a fabric, wherein the fabric is woven, knitted, nonwoven, or combinations thereof;
   b) applying a first layer of a mixture comprising a resorcinol-formaldehyde-latex composition and a tacky resin to at least one surface of the fabric to form a coated fabric;
   c) heating and/or curing the coated fabric to form a fabric-rubber composite;
   d) applying a second layer of a tacky finish to at least one surface of the fabric-rubber composite, wherein said tacky finish comprises:
      (i) at least one tacky resin;
      (ii) at least one unvulcanized rubber; and
      (iii) at least one adhesion promoter; and
   (e) attaching the fabric-rubber composite to a tire carcass.

10. The method of claim 9, wherein the at least one tacky resin is selected from the group consisting of phenol-containing resins, aromatic resins, hydrocarbon resins, terpene resins, indene resins, coumarone resins, rosin-based resins, and mixtures thereof.

11. The method of claim 9, wherein the at least one tacky resin of the tacky finish is a rosin ester resin.

12. The method of claim 9, wherein the adhesion promoter is resorcinol-formaldehyde resin.

13. The method of claim 9, wherein the tacky finish further includes at least one antioxidant.

14. The method of claim 13, wherein the at least one antioxidant is selected from hindered phenol compounds, acylphenylenediamine compounds, diphenylamine compounds, mercaptan compounds, thioester compounds, thioether compounds, hydroquinoline compounds, and mixtures thereof.

15. The method of claim 9, wherein the at least one adhesion promoter includes silica.

16. The method of claim 9, wherein the at least one tacky resin of the tacky finish is a rosin ester resin and the at least one adhesion promoter is a resorcinol-formaldehyde resin.

17. The method of claim 9, wherein the fabric-rubber composite of after step "d" exhibits a tack level of at least 5 N after aging in a 70° C. oven for 24 h.

18. The method of claim 9, wherein the fabric-rubber composite of after step "d" exhibits a tack level of 5-30 N.

* * * * *

UNITED STATES PATENT AND TRADEMARK OFFICE
CERTIFICATE OF CORRECTION

PATENT NO. : 12,233,667 B2
APPLICATION NO. : 16/851505
DATED : February 25, 2025
INVENTOR(S) : Dany Michiels et al.

It is certified that error appears in the above-identified patent and that said Letters Patent is hereby corrected as shown below:

In the Claims

In Column 68, Line 44, Claim 17 delete "of" after "composite"

In Column 68, Line 47, Claim 18 delete "of" after "composite"

Signed and Sealed this
Twenty-fifth Day of March, 2025

Coke Morgan Stewart
*Acting Director of the United States Patent and Trademark Office*